(12) United States Patent
Nakamura et al.

(10) Patent No.: US 10,838,178 B2
(45) Date of Patent: Nov. 17, 2020

(54) IMAGING LENS

(71) Applicant: Sony Corporation, Tokyo (JP)

(72) Inventors: Akira Nakamura, Tokyo (JP); Yoshitomo Onoda, Tokyo (JP); Atsuo Minato, Kanagawa (JP)

(73) Assignee: Sony Corporation, Tokyo (JP)

(*) Notice: Subject to any disclaimer, the term of this patent is extended or adjusted under 35 U.S.C. 154(b) by 121 days.

(21) Appl. No.: 15/775,573

(22) PCT Filed: Oct. 7, 2016

(86) PCT No.: PCT/JP2016/079993
§ 371 (c)(1),
(2) Date: May 11, 2018

(87) PCT Pub. No.: WO2017/086051
PCT Pub. Date: May 26, 2017

(65) Prior Publication Data
US 2018/0341089 A1    Nov. 29, 2018

(30) Foreign Application Priority Data
Nov. 20, 2015 (JP) ................. 2015-227643

(51) Int. Cl.
*G02B 13/04* (2006.01)
*G02B 9/62* (2006.01)
(Continued)

(52) U.S. Cl.
CPC .............. *G02B 13/04* (2013.01); *G02B 9/62* (2013.01); *G02B 13/0045* (2013.01); *G02B 13/18* (2013.01)

(58) Field of Classification Search
CPC ...... G02B 13/04; G02B 9/62; G02B 13/0015; G02B 13/0045; G02B 13/06; G02B 13/18
(Continued)

(56) References Cited

U.S. PATENT DOCUMENTS

| 6,339,508 B1 | 1/2002 | Nozawa et al. |
| 2007/0139793 A1 | 6/2007 | Kawada |

(Continued)

FOREIGN PATENT DOCUMENTS

| CN | 101149465 A | 3/2008 |
| CN | 201852987 U | 6/2011 |

(Continued)

OTHER PUBLICATIONS

International Search Report and English translation thereof dated Nov. 8, 2016 in connection with International Application No. PCT/JP2016/079993.

(Continued)

*Primary Examiner* — Jordan M Schwartz
(74) *Attorney, Agent, or Firm* — Wolf, Greenfield & Sacks, P.C.

(57) ABSTRACT

An imaging lens includes a first lens having a negative refracting power and having a meniscus shape; a second lens having a negative refracting power and having a meniscus shape; a third lens having a positive refracting power and having a meniscus shape; an aperture stop; a fourth lens having a positive refracting power and having a bi-convex shape; a fifth lens having a negative refracting power and having a bi-concave shape; and a sixth lens having a positive refracting power and having a bi-convex shape The imaging lens has a total angle of view of 150 degrees or more, and fulfills predetermined conditional expressions.

18 Claims, 13 Drawing Sheets

(51) Int. Cl.
*G02B 13/00* (2006.01)
*G02B 13/18* (2006.01)

(58) Field of Classification Search
USPC .................................................. 359/713, 752
See application file for complete search history.

(56) References Cited

U.S. PATENT DOCUMENTS

| | | | |
|---|---|---|---|
| 2007/0217035 A1 | 9/2007 | Baba | |
| 2008/0074761 A1* | 3/2008 | Yamakawa | G02B 13/04 359/794 |
| 2009/0251801 A1 | 10/2009 | Jung et al. | |
| 2010/0142062 A1 | 6/2010 | Asami et al. | |
| 2012/0026285 A1 | 2/2012 | Yoshida et al. | |
| 2014/0126070 A1 | 5/2014 | Ning | |
| 2014/0240853 A1* | 8/2014 | Kubota | G02B 13/18 359/714 |
| 2015/0062720 A1* | 3/2015 | Lai | G02B 13/04 359/713 |
| 2018/0335613 A1 | 11/2018 | Nakamura et al. | |

FOREIGN PATENT DOCUMENTS

| | | |
|---|---|---|
| CN | 203630431 U | 6/2014 |
| CN | 201438236 U | 4/2020 |
| EP | 1734393 A1 | 12/2006 |
| JP | 2000-292692 A | 10/2000 |
| JP | 2004-029282 A | 1/2004 |
| JP | 2006-349920 A | 12/2006 |
| JP | 2007-164079 A | 6/2007 |
| JP | 2007-249073 A | 9/2007 |
| JP | 2007-279632 A | 10/2007 |
| JP | 2009-063877 A | 3/2009 |
| JP | 2010-243709 A | 10/2010 |
| JP | 2013-003545 A | 1/2013 |
| JP | 2013-073156 A | 4/2013 |
| JP | 2013-073164 A | 4/2013 |
| KR | 2014-0019663 A | 2/2014 |
| WO | WO 2010/113669 A1 | 10/2010 |
| WO | WO 2016/125613 A1 | 8/2016 |

OTHER PUBLICATIONS

Written Opinion and English translation thereof dated Nov. 8, 2016 in connection with International Application No. PCT/JP2016/079993.
International Preliminary Report on Patentability and English translation thereof dated May 31, 2018 in connection with International Application No. PCT/JP2016/079993.
International Search Report and English translation thereof dated Nov. 8, 2016 in connection with International Application No. PCT/JP2016/079992.
Written Opinion and English translation thereof dated Nov. 8, 2016 in connection with International Application No. PCT/JP2016/079992.
International Preliminary Report on Patentability and English translation thereof dated May 31, 2018 in connection with International Application No. PCT/JP2016/079992.
Partial European Search Report dated Feb. 19, 2019 in connection with European Application No. 16866052.0.
Extended European Search Report dated Feb. 19, 2019 in connection with European Application No. 16866053.8.
Gross et al., Handbook of Optical Systems, vol. 3: Aberration Theory and Correction of Optical Systems, Jan. 1, 2007, Wiley-VCH, Weinheim, DE, XP055258161, pp. 377-379.
Extended European Search Report dated May 28, 2019 in connection with European Application No. 16866052.0.
Chinese Office Action dated Mar. 30, 2020 in connection with Chinese Application No. 201680066178.3 and English translation thereof.
Chinese Office Action dated Mar. 30, 2020 in connection with Chinese Application No. 201680066135.5, and English translation thereof.
Japanese Office Action dated Apr. 7, 2020 in connection with Japanese Application No. 2017-551769, and English translation thereof.

* cited by examiner

SPHERICAL ABERRATION
F/2.02

ASTIGMATISM
Angle (deg)

SPHERICAL ABERRATION
F/2.03

ASTIGMATISM
Angle (deg)

SPHERICAL ABERRATION
F/1.47

ASTIGMATISM
Angle (deg)

SPHERICAL ABERRATION
F/1.47

ASTIGMATISM
Angle (deg)

IMAGING LENS

CROSS-REFERENCE TO RELATED APPLICATIONS

This application claims the benefit under 35 U.S.C. § 371 as a U.S. National Stage Entry of International Application No. PCT/JP2016/079993, filed in the Japanese Patent Office as a Receiving Office on Oct. 7, 2016, which claims priority to Japanese Patent Application Number JP2015-227643, filed in the Japanese Patent Office on Nov. 20, 2015.

TECHNICAL FIELD

The present technique relates to a technical field of an imaging lens which, for example, is suitable for an on-board camera, a monitoring camera, a camera for a portable apparatus and the like.

CITATION LIST

Patent Literature

[PTL 1]
 JP 2009-63877A
[PTL 2]
 JP 2013-3545A
[PTL 3]
 JP 2013-73156A

BACKGROUND ART

In recent years, image pickup devices for an on-board camera, a monitoring camera, a camera for a portable apparatus, and the like have become popular. For these image pickup devices, along with miniaturization and high-pixelization of an image pickup element, represented by a CCD or a CMOS, which captures an image formed by an imaging lens, it is required for the imaging lens to realize the miniaturization, the low cost, and the satisfactory peripheral resolution performance while ensuring the wide angle of view. The imaging lens fulfilling such requests, for example, include ones described in PTL 1 to PTL 3.

SUMMARY

Technical Problems

PTL 1 proposes an imaging lens which is configured by four groups and five sheets of lenses, and in which a chromatic aberration is suppressed by cement of a fourth lens including a plastic, and a fifth lens including a plastic, and a total angle of view exceeds 180 degrees. However, the cement between the plastic lenses includes a risk in which it is necessary to use an adhesive agent and to carry out processes for the cement, and moreover a shape of a cemented surface is changed along with a temperature change, so that the lenses cemented become easy to peel off.

PTL 2 proposes an imaging lens which is configured by five group and five sheets of lenses, and in which a total angle of view exceeds 180 degrees. However, the imaging lens has a configuration in which the rear group is separated into two sheets of positive and negative lenses, and thus the chromatic aberration is too much to correct, and it is difficult to obtain the satisfactory resolution performance up to the periphery.

There is PTL 3 as a document in which the problems in the two documents are solved. PTL 3 proposes an imaging lens which is configured by six groups and six sheets of lenses, and in which a negative power, a negative power, a positive power, a positive power, a negative power, and a positive power are arranged in terms of the power arrangement of the lenses from an object side, and a total angle of view exceeds 180 degrees. However, in each of the examples, each of a first lens, a fourth lens, and a fifth lens includes a glass material. Moreover, there are six examples in each of which the relative inexpensive glass is used in which of the constituent lenses, in the first lens having the largest volume and the largest lens effective surface, a refractive index Nd in a d-line=1.7725, and an Abbe's number vd=49.6. However, there are 11 examples in each of which an expensive glass material is used in which a refractive index Nd=1.883, and an Abbe's number vd=42.7. As a result, the expensive imaging lens is used in terms of the imaging lens having an F-value of approximately 2. Furthermore, there is adopted a design in which the imaging lens can be further miniaturized in consideration of a ratio of a distance from a surface on an object side of the first lens to an image surface to a focal length of the entire system of the imaging lens, and a ratio of a curvature radius on an optical axis of the surface on the object side of the first lens to a focal length of the entire system of the imaging lens.

Therefore, the development of the imaging lens is desired in which the total angle of view is as wide as 150 degrees or more, and which exhibits a high-image quality, is compact, is inexpensive, and keeps a stable quality under a harsh environment in an on-board camera or the like.

In the light of the foregoing, an object of an imaging lens of the present technique is to provide an imaging lens in which the total angle of view is 150 degrees, and which exhibits a high-image quality, is compact, is inexpensive, and keeps a stable quality under a harsh environment in an on-board camera or the like.

Solution to Problems

A first imaging lens according to the present technique includes a first lens, a second lens, a third lens, an aperture stop, a fourth lens, a fifth lens, and a six lens which are arranged in order from an object side toward an image surface side and is configured by six groups and six sheets of independent lenses as a whole. In this case, the first lens has a positive refracting power, and has a meniscus shape in which a convex surface is directed toward the object side. The second lens has a negative refracting power, and has a meniscus shape in which a convex surface is directed toward the object side. The third lens has a positive refracting power, and has a meniscus shape in which a concave surface is directed toward the object side. The fourth lens has, a positive refracting power, and a bi-convex shape. The fifth lens has a negative refracting power, and a bi-concave shape. The sixth lens has a positive refracting power and a bi-convex shape. In addition, the total angle of view is set equal to or larger than 150 degrees, and following conditional expression (1), conditional expressions (2), and conditional expressions (3) are fulfilled.

$$44 < vd1 \tag{1}$$

$$Nd1 < 1.78 \tag{2}$$

$$2.505 < f456/f < 3.5 \tag{3}$$

where
vd1: an Abbe's number in a d-line of the first lens
Nd1: a refractive index in the d-line of the first lens
f456: a synthetic focal length of the fourth lens, the fifth lens, and the sixth lens
f: a focal length of an entire system A second imaging lens according to the present technique includes a first lens, a second lens, a third lens, an aperture stop, a fourth lens, a fifth lens, and a six lens which are arranged in order from an object side toward an image surface side and is configured by six groups and six sheets of independent lenses as a whole. In this case, the first lens has a positive refracting power, and has a meniscus shape in which a convex surface is directed toward the object side. The second lens has a negative refracting power, and has a meniscus shape in which a convex surface is directed toward the object side. The third lens has a positive refracting power, and has a meniscus shape in which a concave surface is directed toward the object side. The fourth lens has a positive refracting power and a bi-convex shape. The fifth lens has a negative refracting power, and a bi-concave shape. The sixth lens has a positive refracting power and a bi-convex shape. In addition, the total angle of view is set equal to or larger than 150 degrees, and following conditional expression (1), conditional expressions (2), and conditional expressions (8) are fulfilled.

$$44 < vd1 \tag{1}$$

$$Nd1 < 1.78 \tag{2}$$

$$10.5 < R1/f < 16 \tag{8}$$

where
vd1: an Abbe's number in a d-line of the first lens
Nd1: a refractive index in the d-line of the first lens
R1: a curvature radius on an optical axis of a surface on the object side of the first lens
f: a focal length of an entire system A third imaging lens according to the present technique includes a first lens, a second lens, a third lens, an aperture stop, a fourth lens, a fifth lens, and a six lens which are arranged in order from an object side toward an image surface side and is configured by six groups and six sheets of independent lenses as a whole. In this case, the first lens has a positive refracting power, and has a meniscus shape in which a convex surface is directed toward the object side. The second lens has a negative refracting power, and has a meniscus shape in which a convex surface is directed toward the object side. The third lens has a positive refracting power, and has a meniscus shape in which a concave surface is directed toward the object side. The fourth lens has a positive refracting power and a bi-convex shape. The fifth lens has a negative refracting power and a bi-concave shape. The sixth lens has a positive refracting power and a bi-convex shape. In addition, the total angle of view is set equal to or larger than 150 degrees, and following conditional expression (1), conditional expressions (2), and conditional expressions (9) are fulfilled.

$$44 < vd1 \tag{1}$$

$$Nd1 < 1.78 \tag{2}$$

$$10.7 < L/f < 16.5 \tag{9}$$

where
vd1: an Abbe's number in a d-line of the first lens
Nd1: a refractive index in the d-line of the first lens
L: a distance from a vertex on the optical axis of the surface on the object side of the first lens to the image surface
f: a focal length of an entire system A fourth imaging lens according to the present technique includes a first lens, a second lens, a third lens, an aperture stop, a fourth lens, a fifth lens, and a six lens which are arranged in order from an object side toward an image surface side and is configured by six groups and six sheets of independent lenses as a whole. In this case, the first lens has a positive refracting power, and has a meniscus shape in which a convex surface is directed toward the object side. The second lens has a negative refracting power, and has a meniscus shape in which a convex surface is directed toward the object side. The third lens has a positive refracting power, and has a meniscus shape in which a concave surface is directed toward the object side. The fourth lens has a positive refracting power and a bi-convex shape. The fifth lens has a negative refracting power, and a bi-concave shape. The sixth lens has a positive refracting power and a bi-convex shape. In addition, the total angle of view is set equal to or larger than 150 degrees, and a following conditional expression (10) is fulfilled.

$$1.77 < f6/f < 2.415 \tag{10}$$

where
f6: a focal length of the sixth lens
f: a focal length of an entire system A fifth imaging lens according to the present technique includes a first lens, a second lens, a third lens, an aperture stop, a fourth lens, a fifth lens, and a six lens which are arranged in order from an object side toward an image surface side and is configured by six groups and six sheets of independent lenses as a whole. In this case, the first lens has a positive refracting power, and has a meniscus shape in which a convex surface is directed toward the object side. The second lens has a negative refracting power, and has a meniscus shape in which a convex surface is directed toward the object side. The third lens has a positive refracting power, and has a meniscus shape in which a concave surface is directed toward the object side. The fourth lens has a positive refracting power and a bi-convex shape. The fifth lens has a negative refracting power and a bi-concave shape. The sixth lens has a positive refracting power and a bi-convex shape. In addition, the total angle of view is set equal to or larger than 150 degrees, and a following conditional expression (11) is fulfilled.

$$1.75 < R12/f < 2.7 \tag{11}$$

where
R12: a curvature radius on the optical axis of the surface on the object side of the sixth lens
f: a focal length of an entire system In the first imaging lens to the fifth imaging lens according to the present technique, it is possible to provide the imaging lens in which the total angle of view is as wide as 150 degrees or more, and which exhibits a high-image quality, is compact, is inexpensive, and keeps a stable quality under a harsh environment in an on-board camera or the like.

In addition, in the imaging lens according to the present technique, at least one conditional expression of the following conditional expression (4), conditional expression (5), conditional expression (6), and conditional expression (7) is desirably fulfilled. In terms of the form, a single form or a combination form may be available.

$$-0.25 < (R10+R11)/(R10-R11) < 0.6 \tag{4}$$

$$-4 < R6/f < -1 \tag{5}$$

$$0.1<(R8+R9)/(R8-R9)<0.8 \quad (6)$$

$$-2.3<f5/f<-1.1 \quad (7)$$

where

R10: a curvature radius on the optical axis of the surface on the object side of the fifth lens R11: a curvature radius on the optical axis of the surface on the image side of the fifth lens R6: a curvature radius on the optical axis of the surface on the image side of the third lens f: a focal length of an entire system R8: a curvature radius on the optical axis of the surface on the object side of the fourth lens R9: a curvature radius on the optical axis of the surface on the image side of the fourth lens f5: a focal length of the fifth lens Advantageous Effect of Invention According to the present technique, in the lens configuration of the six groups and six sheets of lenses, by setting the shapes and the powers of the each lenses to the preferred forms, it is possible to obtain the imaging lens in which a total angle of view is as wide as 150 degrees or more, and which exhibits a high-image quality, is compact, is inexpensive, and keeps a stable quality under a harsh environment in an on-board camera or the like.

It should be noted that the effects described in the present description are merely exemplifications and are by no means limited, and other effects may be offered.

DESCRIPTION OF EMBODIMENT

[Imaging Lens According to Embodiment of the Present Technique]

Hereinafter, an image lens according to an embodiment of the present technique will be described with reference to the drawings. It should be noted that in the present technique, a lens shape such as a convex surface or a concave surface, and a sign of a refracting power such as a positive refracting power or a negative refracting power are defined in a paraxial area. In addition, a curvature radius is also defined in the paraxial area. Thus, with respect to polarity, a surface of convex on an object side is defined as being positive and a surface of convex on an image side is defined as being negative. Moreover, a focal length of each lens, synthesis, and an entire system is defined with a value in 587.56 nm of a d-line as a wavelength.

Figure 1:
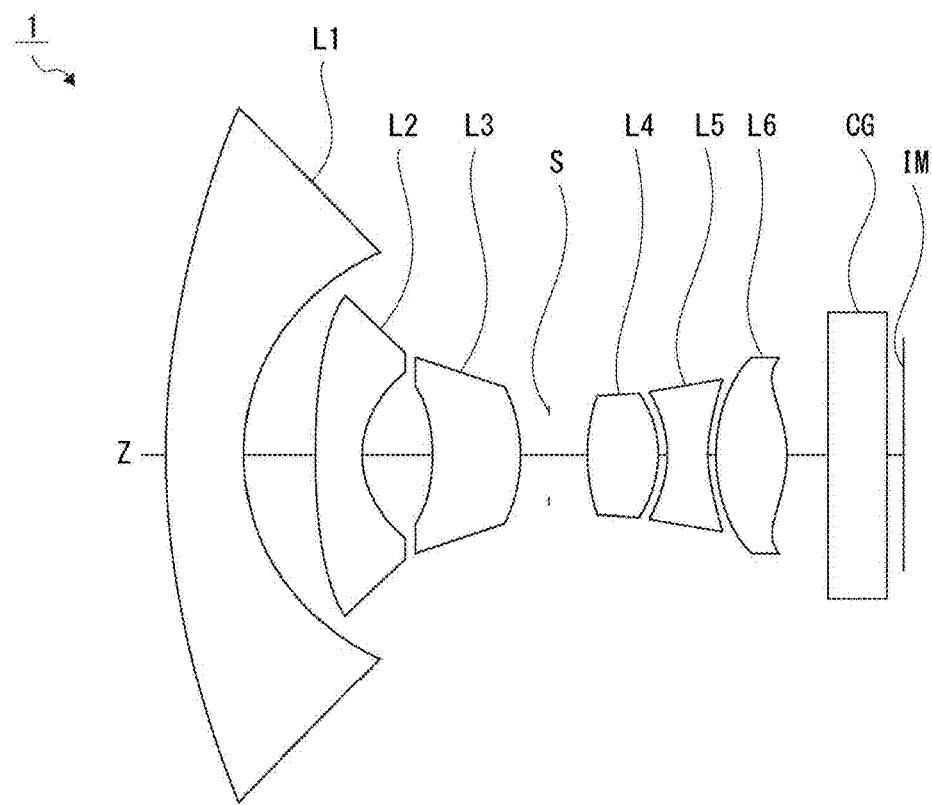
FIG. 1 is a cross-sectional view depicting First Configuration Example of an imaging lens according to an embodiment of the present technique.
Figure 2:
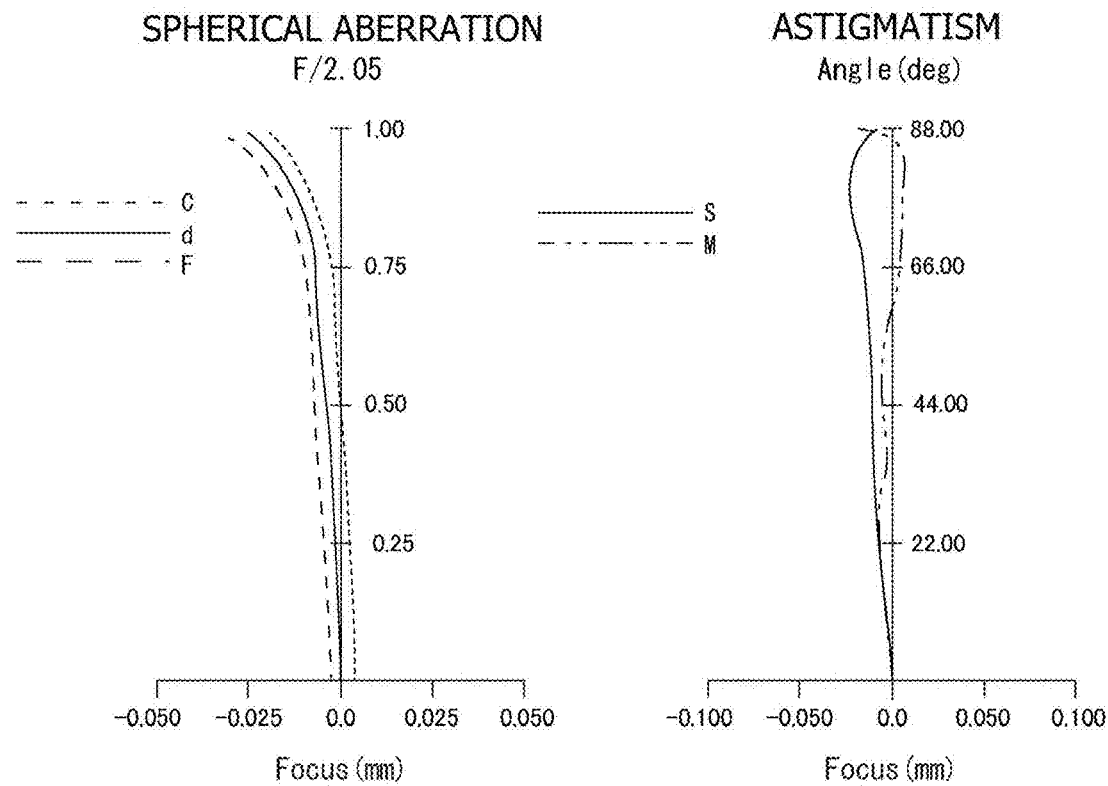
FIG. 2 is an aberration view depicting aberrations in Numerical Example 1 in which concrete numerical values are applied to the imaging lens depicted in FIG. 1.

FIG. 1 is a cross sectional view depicting a numerical example of an imaging lens according to an embodiment of the present technique. Since each of imaging lenses of Example 2 to Example 12 which will be described later also has the similar basic configuration as that of Example 1 depicted in FIG. 1 and is also similar in illustrated method to that of Example 1 depicted in FIG. 1, in this case, the imaging lens according to the embodiment of the present technique will be described with reference to FIG. 1.

In FIG. 1, the left side is set as an object side and the right side is set as an image side, and an optical axis is expressed by Z.

The imaging lens (imaging lens 1 to imaging lens 12) according to the embodiment of the present technique is a lens having a lens configuration of six groups and six sheets of lenses in which a first lens L1, a second lens L2, a third lens L3, a fourth lens L4, a fifth lens L5, and a sixth lens L6 are arranged in order from the object side to the image side independently of one another along the optical axis Z. An aperture stop S is arranged between the third lens L3 and the fourth lens L4. By arranging the aperture stop S between the third lens L3 and the fourth lens L4, the miniaturization in the radial direction can be realized and at the same time, a chromatic aberration of magnification can be suppressed.

In FIG. 1, an image surface IM of the imaging lens is also illustrated in consideration of the case where the imaging lens is applied to an image pickup apparatus. In addition, a parallel plate CG for which a cover glass and a low-pass filter necessary when the imaging lens is applied to the image pickup apparatus are supposed is arranged between the sixth lens L6 of the imaging lens, and the image surface IM.

The first lens L1 has a negative refracting power and is formed in a meniscus shape in which a convex surface is directed toward the object side. The first lens L1 is configured in such a manner, so that the first lens L1 becomes advantageous in wide angle and correction of distortion. In addition, in the example, the first lens L1 includes a glass lens. The reason for this is because especially, if the on-board use application is taken into consideration, the weatherability, the impact resistance, the wear resistance, and the like are required for the first lens L1. In addition, the reason why both surfaces of the first lens L1 are formed as spherical surfaces is because it is feared that if the glass as the material is formed as a spherical surface, the cost is increased although the first lens L1 includes of a glass and is formed to have the aspherical surface. However, even if the glass is formed as the aspherical surface, there is no problem in terms of design performance.

The second lens L2 has a negative refracting power and is formed in a meniscus shape in which a convex surface is directed toward the object side. By arranging two sheets of lenses each having the negative refracting power on the object side, the two sheets of lenses can take charge of part of the large negative power. In addition, by forming the surface of the second lens L2 on the object side in the form of the convex surface, incident light ray from a wide angle of view can be folded at a shallow angle in a step-by-step manner through the four surfaces of the first lens L1 and the second lens L2, thereby making easy the wide angle and the correction of the distortion.

The third lens L3 has a positive refracting power and is formed in a meniscus shape in which a concave surface is directed toward the object side. The lens having the positive power is arranged on the object side of the aperture stop S, thereby making easy the chromatic aberration of magnification and the correction of the curvature of field.

In addition, the aperture stop S is arranged between the third lens L3 and the fourth lens L4, thereby making easy the miniaturization in the radial direction of the wide angle imaging lens.

The fourth lens L4 having the positive refracting power and the bi-convex shape, the fifth lens L5 having the negative refracting force and the bi-concave shape, and the sixth lens L6 having the positive refracting power and the bi-convex shape are arranged on the image side of the aperture stop S. By adopting such a triplet configuration, the aberrations exerting an influence on the imaging performance is easy to correct.

In particular, the sixth lens L6 having the positive refracting power is arranged closest to the image side in the imaging lens, whereby the correction of the intervals with the image surface as the imaging surface and an incidence angle of off-axis rays to the image surface, that is, the correction of the back focus and shading is easy to carry out.

The imaging lens of the present technique fulfills all of a conditional expression (1), a conditional expression (2), and a conditional expression (3), or all of a conditional expression (1), a conditional expression (2), and a conditional expression (8), or all of a conditional expression (1), a conditional expression (2), and a conditional expression (9), or a conditional expression (10), or a conditional expression (11).

$$44 < vd1 \tag{1}$$

$$Nd1 < 1.78 \tag{2}$$

$$2.505 < f456/f < 3.5 \tag{3}$$

$$10.5 < R1/f < 16 \tag{8}$$

$$10.7 < L/f < 16.5 \tag{9}$$

$$1.77 < f6/f < 2.415 \tag{10}$$

$$1.75 < R12/f < 2.7 \tag{11}$$

where vd1: an Abbe's number in a d-line of the first lens

Nd1: a refractive index in the d-line of the first lens f456: a synthetic focal length of the fourth lens, the fifth lens, and the sixth lens f: a focal length of an entire system R1: a curvature radius on an optical axis of a surface on the object side of the first lens L: a distance from a vertex on the optical axis of the surface on the object side of the first lens to the image surface f6: a focal length of the sixth lens R12: a curvature radius on the optical axis of the surface on the object side of the sixth lens The conditional expression (1) is an expression for regulating the Abbe's number in 587.56 nm of the d-line of the material constituting the first lens L1, and the conditional expression (2) is an expression for regulating the refractive index. The first lens L1 is a lens element having the maximum volume and the maximum optical effective area of the six sheets of lens elements constituting the imaging lens of the present technique. In addition, one of objects of the present technique is to provide a low-cost imaging lens. Therefore, the low-cost material needs to be used as the material constituting the first lens L1. Thus, for realizing the low cost, the selection range of the materials is regulated by the conditional expression (1) and the conditional expression (2). As described above, although the glass is suppressed as the material constituting the first lens L1, the first lens L1 can also be configured by a material other than the glass.

The conditional expression (3) is an expression for regulating a ratio of the synthetic focal length of the fourth lens L4, the fifth lens L5, and the sixth lens L6 which are arranged on the image side of the aperture stop S to the focal length of the entire system. If the ratio falls below the lower limit as a numerical value, a synthetic refracting power of the fourth lens L4, the fifth lens L5, and the sixth lens L6 becomes strong, and thus the back focus becomes difficult to secure in terms of the imaging lens, which interferes with the arrangement of the filter and the like, and the image surface at the time of the assembly, that is, the focus adjustment of the image pickup element represented by a CCD or a CMOS. In addition, the aberrations including the spherical aberration and the curvature of field become difficult to correct. On the other hand, if the ratio exceeds the upper limit as the numerical value, the synthetic refracting power of the fourth lens L4, the fifth lens L5, and the sixth lens L6 becomes weak, and thus the back focus becomes long in terms of the imaging lens and the total length also becomes long in terms of the imaging lens, which interferes with the increasing in size.

The conditional expression (8) is an expression for regulating a ratio of the curvature radius on the optical axis of the surface on the object side of the first lens L1 to the focal length of the imaging lens. The expression means that the surface on the object side of the first lens L1 is convex on the object side. If the ratio falls below the lower limit as the numerical value, the curvature radius on the optical axis of the surface on the object side of the first lens L1 becomes small, and thus the refracting power of the first lens L1 becomes weak, which makes the wide angle difficult. On the other hand, if the ratio exceeds the upper limit as the numerical value, the curvature radius on the optical axis of the surface on the object side of the first lens L1 becomes large. As a result, the cost is increased along with the increasing in size of the optical effective diameter of the surface on the object side of the first lens L1, and the size is also increased in terms of the imaging lens, which injures the commercial value. In addition, the distortion becomes difficult to correct.

The conditional expression (9) is an expression for regulating a ratio of the entire length, of the imaging lens, which is defined as the distance from the vertex on the optical axis of the surface on the object side of the first lens to the image surface to the focal length. If the ratio falls below the lower limit as the numerical value, the entire length becomes short in terms of the imaging lens and thus the miniaturization is realized. However, the wide angle becomes difficult to attain, or the aberrations become difficult to correct. On the other hand, if the ratio exceeds the upper limit as the numerical value, the entire length becomes long in terms of the imaging lens, which injures the value in terms of the commercial product.

The conditional expression (10) is an expression for regulating a ratio of the focal length of the sixth lens L6 to the focal length of the entire system of the imaging lens. The expression means that the sixth lens has the positive refracting power. If the ratio falls below the lower limit as the numerical value, the refracting power of the sixth lens L6 becomes strong, and thus the back focus becomes difficult to secure in terms of the imaging lens, which interferes with the arrangement of the filter and the like, and the image surface at the time of the assembly, that is, the focus adjustment of the image pickup element represented by a CCD or a CMOS. If the ratio exceeds the upper limit as the numerical value, the refracting power of the sixth lens L6 becomes weak, the back focus becomes long, and the entire length also becomes long in terms of the imaging lens, which interferes with the increase in size.

The conditional expression (11) is an expression for regulating a ratio of the curvature radius on the optical axis of the surface on the object side of the sixth lens to the focal length of the entire system of the imaging lens. By setting the curvature radius on the optical axis of the surface on the object side of the sixth lens within the regulated range, it becomes possible to keep the balance between the incidence angle with respect to the imaging surface of the off-axis rays, and the image height.

It should be noted that the imaging lens of the present technique may be configured to fulfill a conditional expression (3-1), a conditional expression (9-1), and a conditional expression (11-1) instead of fulfilling the conditional expression (3), the conditional expression (9), and the conditional expression (11), respectively.

$$2.505 < f456/f < 3.3 \tag{3-1}$$

$$11 < L/f < 16.5 \tag{9-1}$$

$$1.8 < R12/f < 2.6 \tag{11-1}$$

where
f456: a synthetic focal length of the fourth lens, the fifth lens, and the sixth lens
f: a focal length of an entire system
L: a distance from a vertex on the optical axis of the surface on the object side of the first lens to the image surface
R12: a curvature radius on the optical axis of the surface on the object side of the sixth lens In addition, the imaging lens according to the present technique desirably fulfills at least one conditional expression of the following conditional expression (4), conditional expression (5), conditional expression (6), and conditional expression (7). In terms of the form, any of the single conditional expression or a combination of the conditional expressions may be available.

$$-0.25 < (R10+R11)/(R10-R11) < 0.6 \tag{4}$$

$$-4 < R6/f < -1 \tag{5}$$

$$0.1 < (R8+R9)/(R8-R9) < 0.8 \tag{6}$$

$$-2.3 < f5/f < -1.1 \tag{7}$$

where
R10: a curvature radius on the optical axis of the surface on the object side of the fifth lens
R11: a curvature radius on the optical axis of the surface on the image side of the fifth lens
R6: a curvature radius on the optical axis of the surface on the image side of the third lens
f: a focal length of an entire system
R8: a curvature radius on the optical axis of the surface on the object side of the fourth lens
R9: a curvature radius on the optical axis of the surface on the image side of the fourth lens
f5: a focal length of the fifth lens The conditional expression (4) is an expression for regulating a ratio of a sum to a difference between the curvature radius on the optical axis of the surface on the object side of the fifth lens L5 and the curvature radius on the optical axis of the surface on the image side of the fifth lens. Since the fifth lens L5 is a bi-concave lens, the expression means that the value of the curvature radius on the optical axis of the surface on the object side of the fifth lens L5, and the value of the curvature radius on the optical axis of the surface on the image side of the fifth lens L5 are close to each other in terms of an absolute value. By fulfilling the conditional expression (4), the surface on the object side, and the surface on the image side of the fifth lens L5 can bear approximately, equally the negative refracting power, and thus the negative refracting power of the fifth lens L5 can be increased. As a result, the chromatic aberration and the curvature of field become easy to correct.

The conditional expression (5) is an expression for regulating a ratio of the curvature radius on the optical axis of the surface on the image side of the third lens L3 to the focal length of the imaging lens. The expression means that the surface on the object side of the third lens L3 is convex on the image side. If the ratio falls below the lower limit as the numerical value, the absolute value of the curvature radius on the optical axis of the surface on the image side of the third lens L3 becomes large, and thus the chromatic aberration becomes difficult to correct. On the other hand, if the ratio exceeds the upper limit as the numerical value, the absolute value of the curvature radius on the optical axis of the surface on the image side of the third lens L3 becomes small, and thus coma aberration becomes difficult to correct.

The conditional expression (6) is an expression for regulating a ratio of a sum to a difference between the curvature radius on the optical axis of the surface on the object side of the fourth lens and the curvature radius in the optical axis of the surface on the image side of the fourth lens. Since the fourth lens L4 is formed in the form of a bi-convex shape in terms of the configuration, the expression means that the curvature radius on the optical axis of the surface on the object side of the fourth lens L4 is larger than the curvature radius on the optical axis of the surface on the image side of the fourth lens L4 in terms of the absolute value. If the ratio falls below the lower limit as the numerical value, the curvature radius on the optical axis of the surface on the object side of the fourth lens L4 becomes small, and thus the curvature of field becomes difficult to correct. On the other hand, if the ratio exceeds the upper limit as the numerical value, the spherical aberration becomes difficult to correct.

The conditional expression (7) is an expression for regulating a ratio of the focal length of the fifth lens L5 to the focal length of the entire system. The expression means that the fifth lens L5 has the negative refracting power. If the ratio falls below the lower limit as the numerical value, the negative refracting power of the fifth lens L5 becomes weak. Thus, since the fifth lens L5 is the only lens element having the negative power of the fourth lens L4, the fifth lens L5, and the sixth lens L6 which are arranged from the aperture stop S to the image side, the axial chromatic aberration becomes difficult to correct. On the other hand, if the ratio exceeds the upper limit as the numerical value, the negative refracting power of the fifth lens L5 becomes strong, and thus the chromatic aberration of magnification becomes difficult to correct.

It should be noted that the imaging lens of the present technique may be configured to fulfill a conditional expression (4-1), a conditional expression (5-1), and a conditional expression (6-1) instead of fulfilling the conditional expression (4), the conditional expression (5), and the conditional expression (6), respectively.

$$-0.2<(R10+R11)/(R10-R11)<0.5 \quad (4\text{-}1)$$

$$-3.5<R6/f<-1.5 \quad (5\text{-}1)$$

$$0.115<(R8+R9)/(R8-R9)<0.75 \quad (6\text{-}1)$$

where

R10: a curvature radius on the optical axis of the surface on the object side of the fifth lens R11: a curvature radius on the optical axis of the surface on the image side of the fifth lens R6: a curvature radius on the optical axis of the surface on the image side of the third lens f: a focal length of an entire system R8: a curvature radius on the optical axis of the surface on the object side of the fourth lens R9: a curvature radius on the optical axis of the surface on the image side of the fourth lens

[Numerical Examples of Imaging Lens]

A description will now be given with respect to concrete Numerical Examples of the imaging lens according to the present embodiment. In this case, a description will now be given with respect to Numerical Examples in which concrete numerical values are applied to an imaging lens 1 to the imaging lens 12 of each Configuration Examples depicted in FIG. 1, FIG. 3, FIG. 5, FIG. 7, FIG. 9, FIG. 11, FIG. 13, FIG. 15, FIG. 17, FIG. 19, FIG. 21, and FIG. 23, respectively.

The meanings or the like of reference symbols depicted in following TABLES and descriptions are as follows. "surface number" exhibits a number of an i-th surface counted from the object side to the image side. "Ri" exhibits a value (mm) of a curvature radius of a near axis of the i-th surface, that is, a value of a curvature radius on an optical axis. "Di" exhibits a value (mm) of an axial distance (lens center thickness or air interval) between an i-th surface and an (i+1)-th surface. "Ndi" exhibits a value of a refractive index in a d-line (having a wavelength of 587.56 (nm)) of a material of a lens or the like starting from the i-th surface. "vdi" exhibits a value of an Abbe's number in the d-line of the material of the lens or the like starting from the i-th surface. A portion in which a value of "Ri" is expressed by "∞" exhibits a flat surface or a stop surface (aperture stop S). A surface in which "stop" is described in "surface number" exhibits an aperture stop S.

In some lenses used in Numerical Examples, the lens surface is formed in the form of an aspherical surface. In "surface number," a surface having "*" added thereto exhibits the aspherical surface. The aspherical surface shape is defined by the following expression. In each of TABLES depicting aspherical surface coefficients, "E-n" is an exponential expression with 10 as a base, that is, expresses "10 to the minus n-th power." For example, "1.2345E-05" expresses "1.2345×(10 to the minus fifth power)."

The shape of the aspherical surface is expressed by the following expression.

$$Z=[(Y^2/R)/[1+\text{SQRT}\{1-(1+K)*(Y/R)^2\}]+AA*Y^4+AB*Y^6+AC*Y^8+AD*Y^{10}+AE*Y^{12}$$

In the above aspherical surface expression, a distance in an optical axis direction from a vertex of a lens surface is assigned "Z," and with regard to the polarity, the image surface side is set positive. A height in a direction vertical to the optical axis is assigned "Y," the curvature radius on the optical axis of the surface is assigned R, and a conic constant is assigned "K." "AA," "AB," "AC," "AD," and "AE" exhibit fourth-order, sixth-order, eighth-order, tenth-order, twelfth-order aspherical surface coefficients, respectively.

Each of the imaging lens 1 to the imaging lens 12 to which following Numerical Examples are applied has a total angle of view of 176 degrees or more, and is configured by a first lens L1, a second lens L2, a third lens L3, an aperture stop S, a fourth lens L4, a fifth lens L5, and a sixth lens L6 which are arranged in order from an object side to an image surface side. In this case, the first lens L1 has a negative refracting power and has a meniscus shape in which a convex surface is directed toward the object side. The second lens L2 has a negative refracting power and has a meniscus shape in which a convex surface is directed toward the object side. The third lens L3 has a positive refracting power and has a meniscus shape in which a concave surface is directed toward the object side. The fourth lens L4 has a positive refracting power and has a bi-convex shape. The fifth lens L5 has the negative refracting power and has a bi-concave shape. In addition, the sixth lens L6 has the positive refracting power and has a bi-convex shape. With the lens configuration, the incident light is transmitted through a parallel plate CG to be imaged on an image surface IM. The first lens L1 includes a glass and both surfaces thereof are formed in the form of spherical surfaces. Each of the second lens L2 to the fifth lens L5 includes a plastic. The sixth lens L6 is includes a plastic in Numerical Example 1 to Numerical Example 9, and includes a glass in Numerical Example 10 to Numerical Example 12, and also both the surfaces thereof are formed in the form of spherical surfaces. The reason for this is because an F-value is larger than 1.5 in terms of a specification of the imaging lenses of Numerical Example 10 to Numerical Example 12, and for suppressing a change in characteristics of the imaging lenses following a temperature change, the sixth lens L6 also includes a glass. Incidentally, it is supposed that in Numerical Example 1 to Numerical Example 9, the image pickup element size is ¼ inches, and in Numerical Example 10 to Numerical Example 12, the image pickup element size is ⅓ inches. In addition, the image surface position is set in such a way that the image is in focus in a case where an object point is arranged in a position 400 mm away from the vertex of the surface on the object side of the first lens L1. Although the distortion characteristics are not depicted in the aberrations in the figures, any of Numerical Examples adopts an equidistant projection method. In some Numerical Examples, increase and decrease of the magnification for a specific angle of view are taken into account.

The lens data of Numerical Example 1 in the imaging lens 1 depicted in FIG. 1 is depicted in TABLE 1-1, and the aspherical data thereof is depicted in TABLE 1-2. The total angle of view is 176 degrees, the F-value is 2.05, and the focal length f of the entire system of the imaging lens is 1.048 mm.

TABLE 1-1

| surface number | Ri | Di | Ndi | vdi |
|---|---|---|---|---|
| 1 | 14.600 | 1.300 | 1.589 | 61.3 |
| 2 | 3.728 | 1.219 | | |
| 3* | 150.536 | 0.800 | 1.544 | 55.5 |
| 4* | 1.501 | 1.219 | | |
| 5* | −3.581 | 1.500 | 1.64 | 23.5 |
| 6* | −2.577 | 0.475 | | |
| stop | ∞ | 0.635 | | |
| 8* | 2.208 | 1.250 | 1.544 | 55.5 |
| 9* | −1.606 | 0.147 | | |
| 10* | −1.959 | 0.700 | 1.64 | 23.5 |
| 11* | 2.710 | 0.115 | | |
| 12* | 2.691 | 1.250 | 1.544 | 55.5 |
| 13* | −1.901 | 0.670 | | |
| 14 | ∞ | 1.000 | 1.5168 | 64.2 |
| 15 | ∞ | 0.300 | | |
| IM | ∞ | 0.000 | | |

TABLE 1-2

| aspherical surface | Ki | AAi | ABi | ACi | ADi | AEi |
|---|---|---|---|---|---|---|
| 3 | 0 | 2.5337E−02 | −3.9612E−03 | 1.7028E−04 | 7.7648E−06 | 0 |
| 4 | 0 | −1.7847E−02 | 2.3363E−02 | −2.0352E−02 | −4.5560E−04 | 0 |
| 5 | 0 | −4.9349E−02 | −6.3288E−03 | 1.0901E−02 | −2.5169E−03 | 0 |
| 6 | 0 | −2.3074E−02 | 2.3302E−02 | −1.1656E−02 | 2.6173E−03 | 0 |
| 8 | 0 | −1.8412E−02 | −2.0419E−02 | 5.3346E−03 | −4.6833E−03 | 0 |
| 9 | 0 | 3.9091E−02 | −3.0310E−03 | 1.9674E−03 | −2.0242E−04 | 0 |
| 10 | 0 | −1.7708E−02 | 2.1824E−02 | −2.7829E−02 | 1.0107E−02 | 0 |
| 11 | 0 | −1.3145E−02 | −4.5882E−03 | 2.5473E−04 | −3.0241E−04 | 0 |
| 12 | 0 | −1.4777E−03 | 2.3169E−03 | −3.2644E−05 | 2.2501E−04 | 0 |
| 13 | 0 | 5.9591E−02 | 1.6109E−02 | −2.8316E−03 | 1.4747E−03 | 0 |

Figure 3:
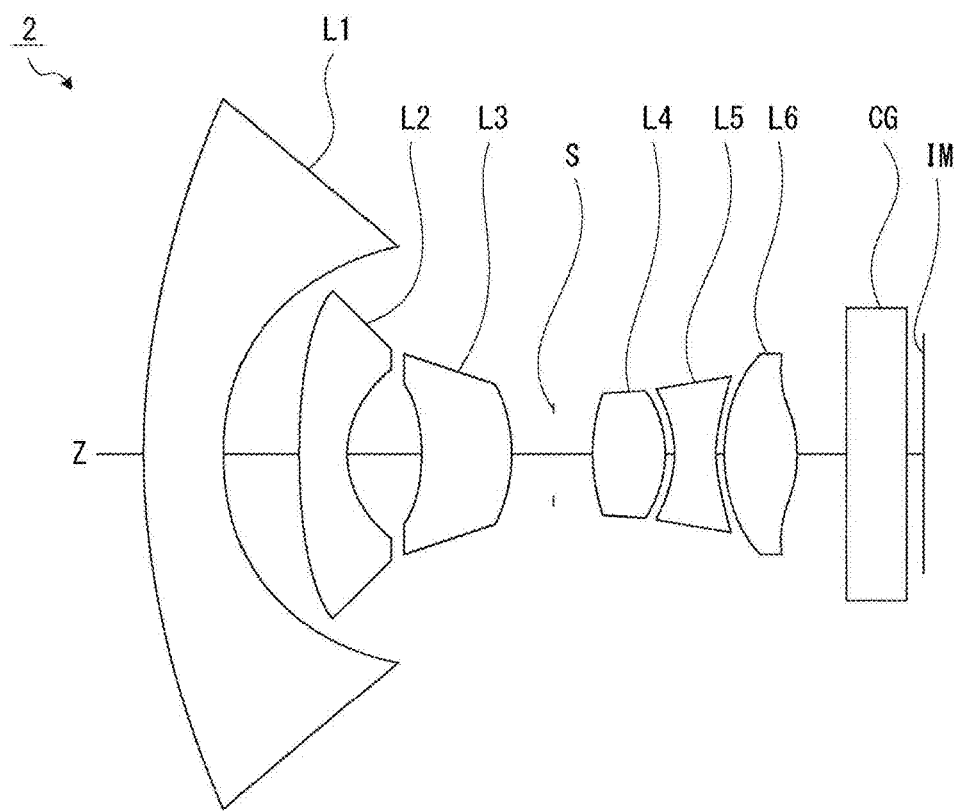
FIG. 3 is a cross-sectional view depicting Second Configuration Example of the imaging lens.
Figure 4:
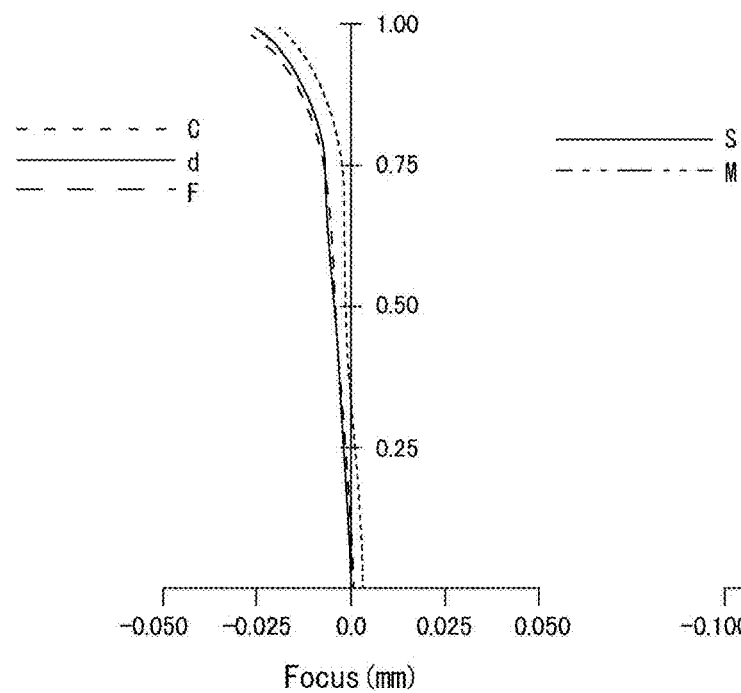
FIG. 4 is an aberration view depicting aberrations in Numerical Example 2 in which concrete numerical values are applied to the imaging lens depicted in FIG. 3.
Figure 4:
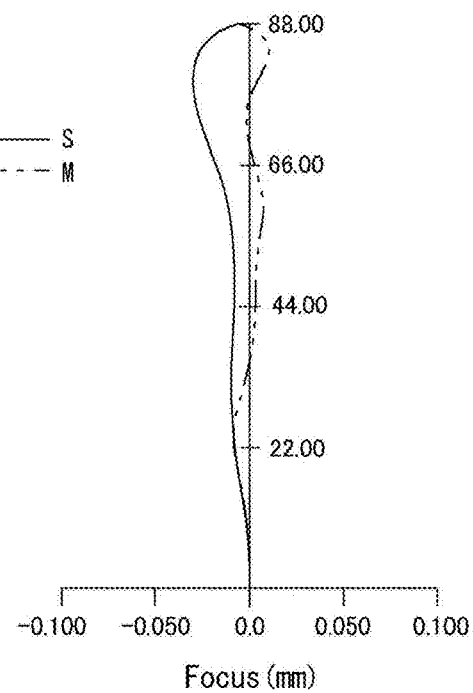

The lens data of Numerical Example 2 in the imaging lens 2 depicted in FIG. 3 is depicted in TABLE 2-1, and the aspherical surface data is depicted in TABLE 2-2. The total angle of view is 176 degrees, the F-value is 2.05, and the focal length f of the entire system of the imaging lens is 1.042 mm.

TABLE 2-1

| surface number | Ri | Di | Ndi | vdi |
|---|---|---|---|---|
| 1 | 13.882 | 1.300 | 1.65844 | 50.86 |
| 2 | 3.500 | 1.256 | | |
| 3* | 62.479 | 0.800 | 1.544 | 55.5 |
| 4* | 1.548 | 1.280 | | |
| 5* | −3.960 | 1.500 | 1.64 | 23.5 |
| 6* | −2.625 | 0.673 | | |
| stop | ∞ | 0.652 | | |
| 8* | 2.332 | 1.250 | 1.544 | 55.5 |
| 9* | −1.591 | 0.147 | | |
| 10* | −1.865 | 0.700 | 1.64 | 23.5 |
| 11* | 2.748 | 0.115 | | |
| 12* | 2.693 | 1.250 | 1.544 | 55.5 |
| 13* | −1.950 | 0.810 | | |
| 14 | ∞ | 1.000 | 1.5168 | 64.2 |
| 15 | ∞ | 0.300 | | |
| IM | ∞ | 0.000 | | |

TABLE 2-2

| aspherical surface | Ki | AAi | ABi | ACi | ADi | AEi |
|---|---|---|---|---|---|---|
| 3 | 0 | 2.6009E−02 | −4.0152E−03 | 1.8167E−04 | 7.9163E−06 | 0 |
| 4 | 0 | −1.9073E−02 | 2.1068E−02 | −2.0740E−02 | 1.6400E−03 | 0 |
| 5 | 0 | −5.1692E−02 | −4.3777E−03 | 1.1309E−02 | −3.0211E−03 | 0 |
| 6 | 0 | −2.1355E−02 | 2.0593E−02 | −8.9710E−03 | 1.5518E−03 | 0 |
| 8 | 0 | −1.0676E−02 | −9.9704E−04 | 3.5557E−03 | −4.5571E−03 | 0 |
| 9 | 0 | 4.3710E−02 | −3.6855E−03 | 5.4950E−04 | 1.3683E−04 | 0 |
| 10 | 0 | −1.7896E−02 | 2.0908E−02 | −2.7144E−02 | 1.0597E−02 | 0 |
| 11 | 0 | −1.9367E−02 | −2.3874E−03 | 6.6277E−04 | −3.2447E−04 | 0 |
| 12 | 0 | −6.5217E−03 | 1.4105E−05 | 8.7606E−05 | 1.6648E−04 | 0 |
| 13 | 0 | 4.8694E−02 | 1.3798E−02 | −3.2418E−03 | 1.1970E−03 | 0 |

Figure 5:
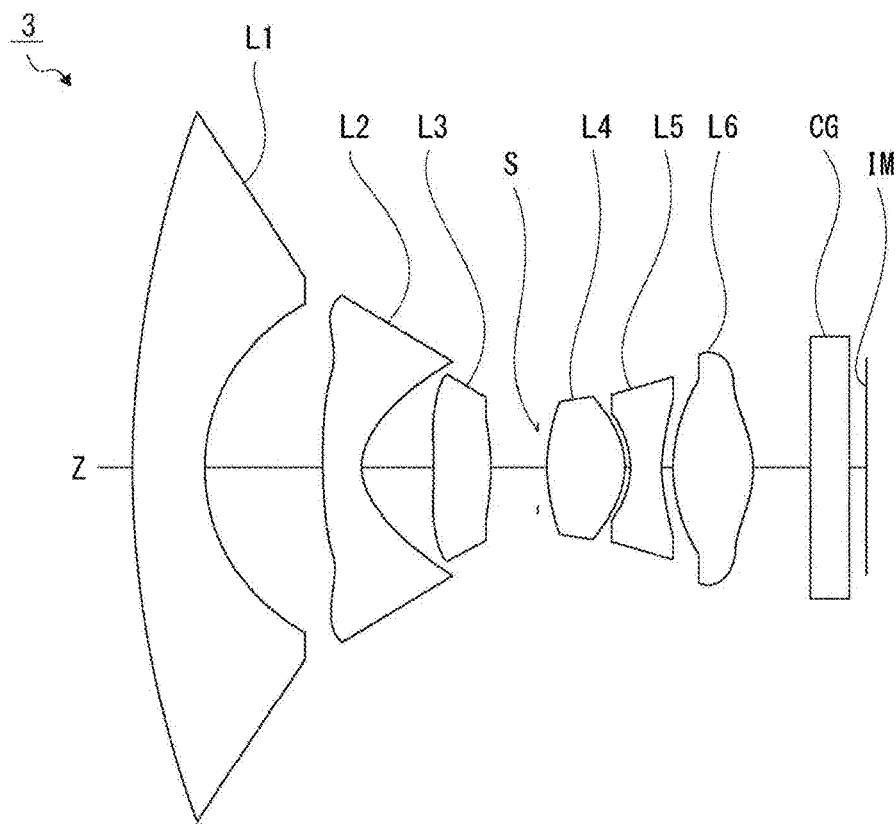
FIG. 5 is a cross-sectional view depicting Third Configuration Example of the imaging lens.
Figure 6:
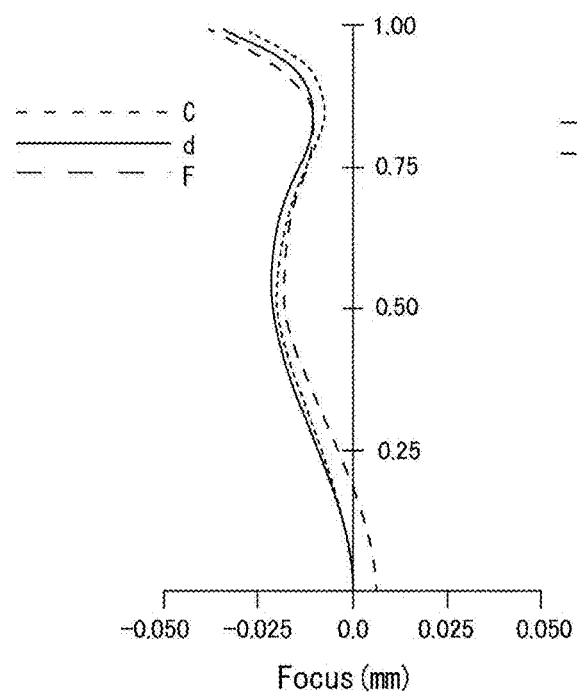
FIG. 6 is an aberration view depicting aberrations in Numerical Example 3 in which concrete numerical values are applied to the imaging lens depicted in FIG. 5.
Figure 6:
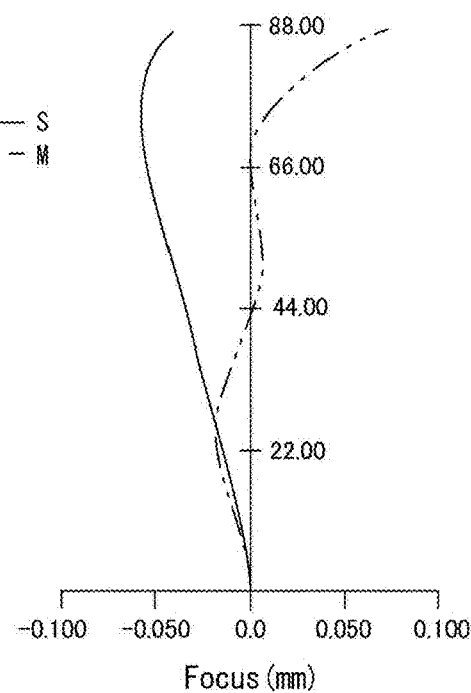

The lens data of Numerical Example 3 in the imaging lens 3 depicted in FIG. 5 is depicted in TABLE 3-1, and the aspherical data thereof is depicted in TABLE 3-2. The total angle of view is 176 degrees, the F-value is 2.03, and the focal length f of the entire system of the imaging lens is 1.141 mm.

TABLE 3-1

| surface number | Ri | Di | Ndi | vdi |
|---|---|---|---|---|
| 1 | 17.937 | 1.300 | 1.589 | 61.3 |
| 2 | 3.263 | 2.150 | | |
| 3* | 10.352 | 0.700 | 1.544 | 55.5 |
| 4* | 1.324 | 1.260 | | |
| 5* | −243790.064 | 1.100 | 1.64 | 23.5 |
| 6* | −3.694 | 0.872 | | |
| stop | ∞ | 0.116 | | |
| 8* | 2.851 | 1.424 | 1.544 | 55.5 |
| 9* | −1.278 | 0.100 | | |
| 10* | −1.733 | 0.600 | 1.64 | 23.5 |
| 11* | 2.432 | 0.155 | | |
| 12* | 2.215 | 1.479 | 1.544 | 55.5 |
| 13* | −2.188 | 1.040 | | |
| 14 | ∞ | 0.700 | 1.5168 | 64.2 |
| 15 | ∞ | 0.300 | | |
| IM | ∞ | 0.000 | | |

TABLE 3-2

| aspherical surface | Ki | AAi | ABi | ACi | ADi | AEi |
|---|---|---|---|---|---|---|
| 3 | 0 | 2.6676E−02 | −1.0209E−02 | 1.0479E−03 | −3.0852E−05 | 0 |
| 4 | −9.3475E−01 | 5.1838E−02 | 4.1801E−02 | −3.1133E−02 | 4.5934E−03 | 0 |
| 5 | 0 | 1.7838E−02 | 8.8928E−03 | 8.0868E−04 | −4.7925E−04 | 0 |
| 6 | 0 | 1.2215E−02 | 2.0462E−02 | −1.1497E−02 | 4.1180E−03 | 0 |
| 8 | 0 | 3.1883E−02 | −2.8153E−02 | 1.7771E−02 | −4.7762E−03 | 0 |
| 9 | 0 | 1.4297E−01 | −6.8417E−03 | −5.7196E−02 | 5.0840E−02 | 0 |
| 10 | 0 | −3.0498E−02 | 6.4712E−02 | −1.0065E−01 | 5.1699E−02 | 0 |
| 11 | 0 | −1.2664E−01 | 7.6139E−02 | −3.1469E−02 | 5.8640E−03 | 0 |
| 12 | 0 | −4.4685E−02 | 9.6822E−03 | −1.4143E−03 | −1.3653E−04 | 0 |
| 13 | −3.6435E−01 | 4.2085E−02 | 7.3373E−03 | −6.3796E−03 | 2.6052E−03 | −3.9458E−04 |

Figure 7:
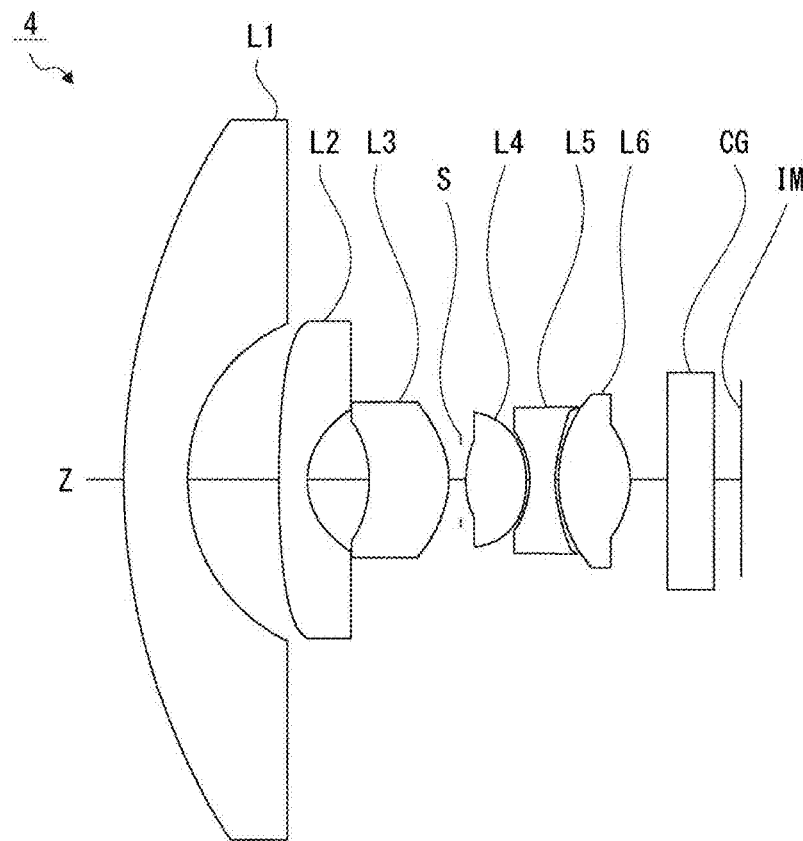
FIG. 7 is a cross-sectional view depicting Fourth Configuration Example of the imaging lens.
Figure 8:
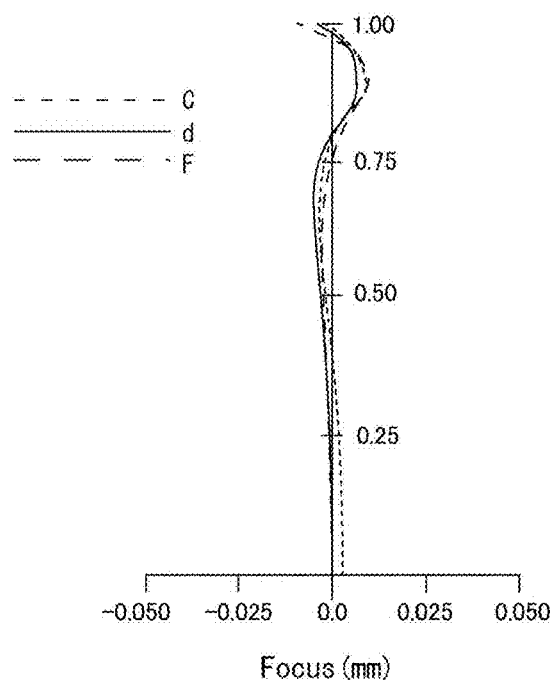
FIG. 8 is an aberration view depicting aberrations in Numerical Example 4 in which concrete numerical values are applied to the imaging lens depicted in FIG. 7.
Figure 8:
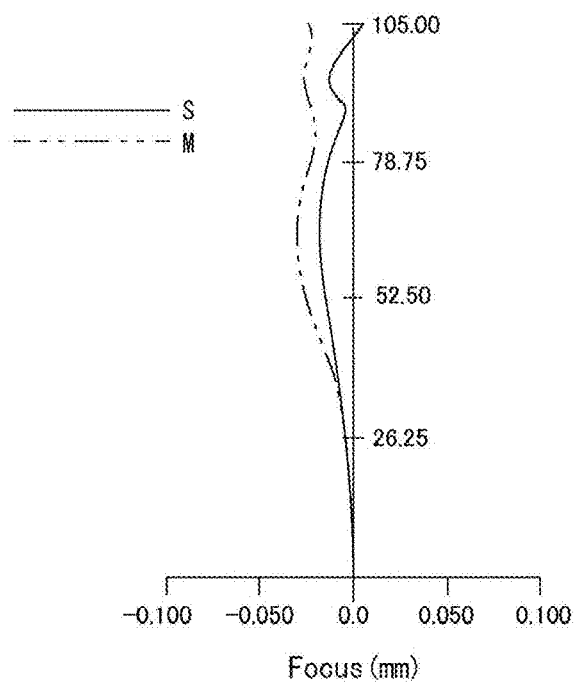

The lens data of Numerical Example 4 in the imaging lens 4 depicted in FIG. 7 is depicted in TABLE 4-1, and the aspherical surface data thereof is depicted in TABLE 4-2. The total angle of view is 210 degrees, the F-value is 2.02, and the focal length f of the entire system of the imaging lens is 1.046 mm.

TABLE 4-1

| surface number | Ri | Di | Ndi | νdi |
|---|---|---|---|---|
| 1 | 13.296 | 1.300 | 1.589 | 61.3 |
| 2 | 3.500 | 1.852 | | |
| 3* | 50.211 | 0.560 | 1.544 | 55.5 |
| 4* | 1.425 | 1.219 | | |
| 5* | −3.306 | 1.600 | 1.64 | 23.5 |
| 6* | −1.856 | 0.301 | | |
| stop | ∞ | 0.100 | | |
| 8* | 3.277 | 1.235 | 1.544 | 55.5 |
| 9* | −1.364 | 0.045 | | |
| 10* | −2.021 | 0.480 | 1.64 | 23.5 |
| 11* | 1.483 | 0.040 | | |
| 12* | 1.994 | 1.455 | 1.544 | 55.5 |
| 13* | −1.702 | 0.745 | | |
| 14 | ∞ | 1.000 | 1.5168 | 64.2 |
| 15 | ∞ | 0.504 | | |
| IM | ∞ | 0.000 | | |

TABLE 4-2

| aspherical surface | Ki | AAi | ABi | ACi | ADi | AEi |
|---|---|---|---|---|---|---|
| 3 | 0 | 3.4492E−03 | −4.9967E−04 | 5.9441E−05 | 0 | 0 |
| 4 | −1.5016E−01 | −2.4309E−02 | 2.1443E−02 | −1.3395E−02 | 0 | 0 |
| 5 | 0 | −4.3367E−02 | −2.3174E−02 | 1.1021E−02 | 0 | 0 |
| 6 | 0 | 2.1075E−02 | 1.8801E−04 | 2.4021E−03 | 0 | 0 |
| 8 | 0 | 2.2758E−02 | 3.5892E−02 | −5.7876E−02 | 0 | 0 |
| 9 | 0 | 6.50E−02 | −8.3750E−02 | 2.9893E−02 | 0 | 0 |
| 10 | 0 | −1.1017E−01 | −9.5259E−02 | 5.8441E−02 | 0 | 0 |
| 11 | 0 | −1.6209E−01 | 2.4568E−02 | −1.6469E−02 | 0 | 0 |
| 12 | 0 | −2.9273E−02 | −1.7963E−02 | 6.0867E−03 | 0 | 0 |
| 13 | 0 | 5.0420E−02 | −1.2850E−02 | 2.0452E−02 | 0 | 0 |

Figure 9:
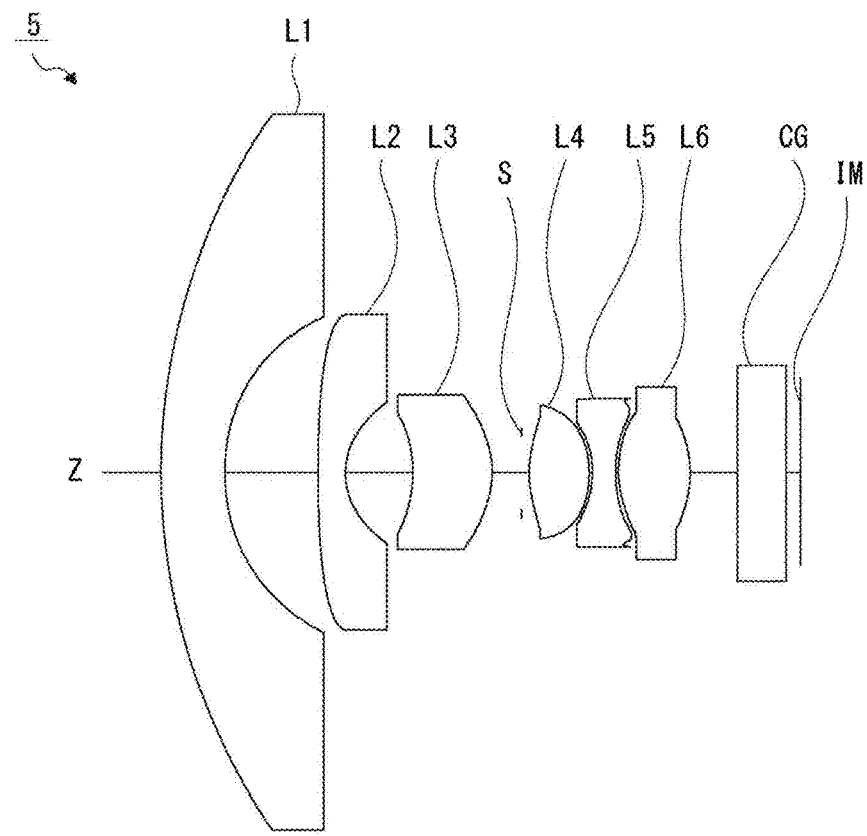
FIG. 9 is a cross-sectional view depicting Fifth Configuration Example of the imaging lens.
Figure 10:
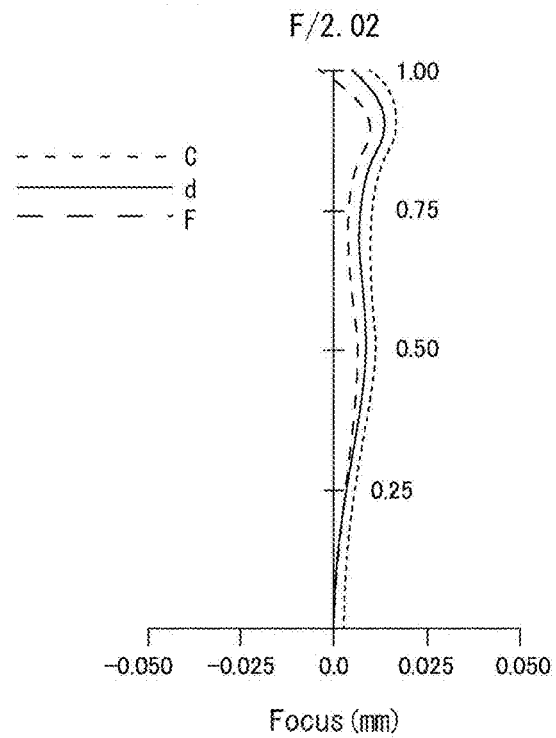
FIG. 10 is an aberration view depicting aberrations in Numerical Example 5 in which concrete numerical values are applied to the imaging lens depicted in FIG. 9.
Figure 10:
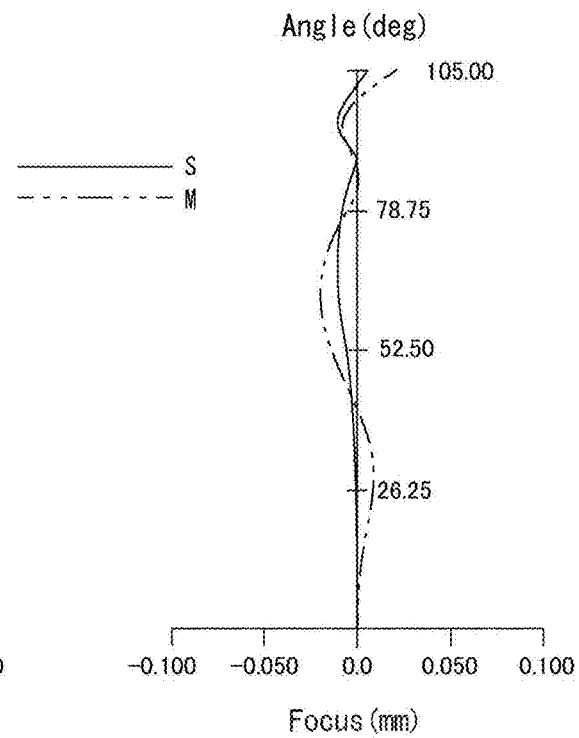

The lens data of Numerical Example 5 in the imaging lens 5 depicted in FIG. 9 is depicted in TABLE 5-1, and the aspherical surface data thereof is depicted in TABLE 5-2. The total angle of view is 210 degrees, the F-value is 2.02, and the focal length f of the entire system of the imaging lens is 1.050 mm.

TABLE 5-1

| surface number | Ri | Di | Ndi | vdi |
|---|---|---|---|---|
| 1 | 12.476 | 1.300 | 1.65844 | 50.86 |
| 2 | 3.500 | 1.902 | | |
| 3* | 11.914 | 0.560 | 1.544 | 55.5 |
| 4* | 1.360 | 1.391 | | |
| 5* | −3.316 | 1.600 | 1.64 | 23.5 |
| 6* | −2.052 | 0.626 | | |
| stop | ∞ | 0.100 | | |
| 8* | 2.883 | 1.235 | 1.544 | 55.5 |
| 9* | −1.533 | 0.088 | | |
| 10* | −2.308 | 0.480 | 1.64 | 23.5 |
| 11* | 1.498 | 0.040 | | |
| 12* | 1.980 | 1.455 | 1.544 | 55.5 |
| 13* | −1.859 | 0.932 | | |
| 14 | ∞ | 1.000 | 1.5168 | 64.2 |
| 15 | ∞ | 0.300 | | |
| IM | ∞ | 0.000 | | |

TABLE 5-2

| aspherical surface | Ki | AAi | ABi | ACi | ADi | AEi |
|---|---|---|---|---|---|---|
| 3 | 0 | −3.9910E−03 | 3.3835E−04 | 9.6595E−06 | 0 | 0 |
| 4 | −2.7068E−01 | −2.0649E−02 | 7.8867E−03 | −6.8378E−03 | 0 | 0 |
| 5 | 0 | −3.4699E−02 | −1.2735E−02 | 5.5749E−03 | 0 | 0 |
| 6 | 0 | 1.0443E−02 | 1.7428E−03 | 1.0943E−03 | 0 | 0 |
| 8 | 0 | 2.0555E−02 | 3.9139E−02 | −4.0377E−02 | 0 | 0 |
| 9 | 0 | 1.3558E−01 | −1.2554E−01 | 2.1581E−03 | 0 | 0 |
| 10 | 0 | −4.6074E−02 | −1.0522E−01 | −3.2037E−02 | 0 | 0 |
| 11 | 0 | −1.5490E−01 | 2.1779E−02 | −2.4482E−02 | 0 | 0 |
| 12 | 0 | −3.0697E−02 | −1.6774E−02 | 1.5413E−03 | 0 | 0 |
| 13 | 0 | 3.8191E−02 | −1.3675E−02 | 1.7713E−02 | 0 | 0 |

Figure 11:
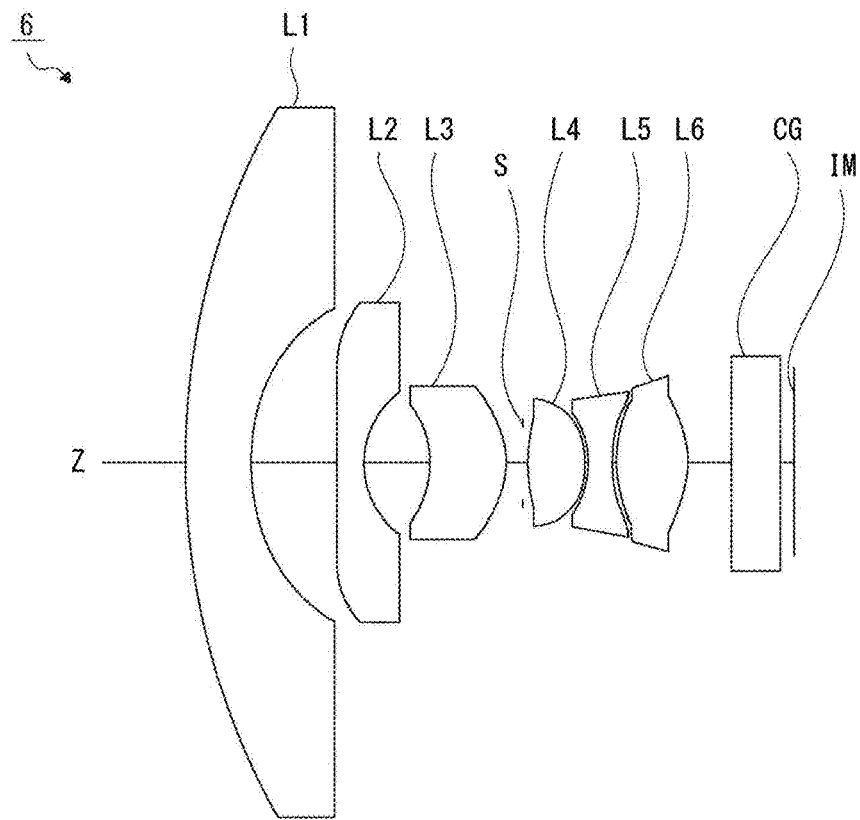
FIG. 11 is a cross-sectional view depicting Sixth Configuration Example of the imaging lens.
Figure 12:
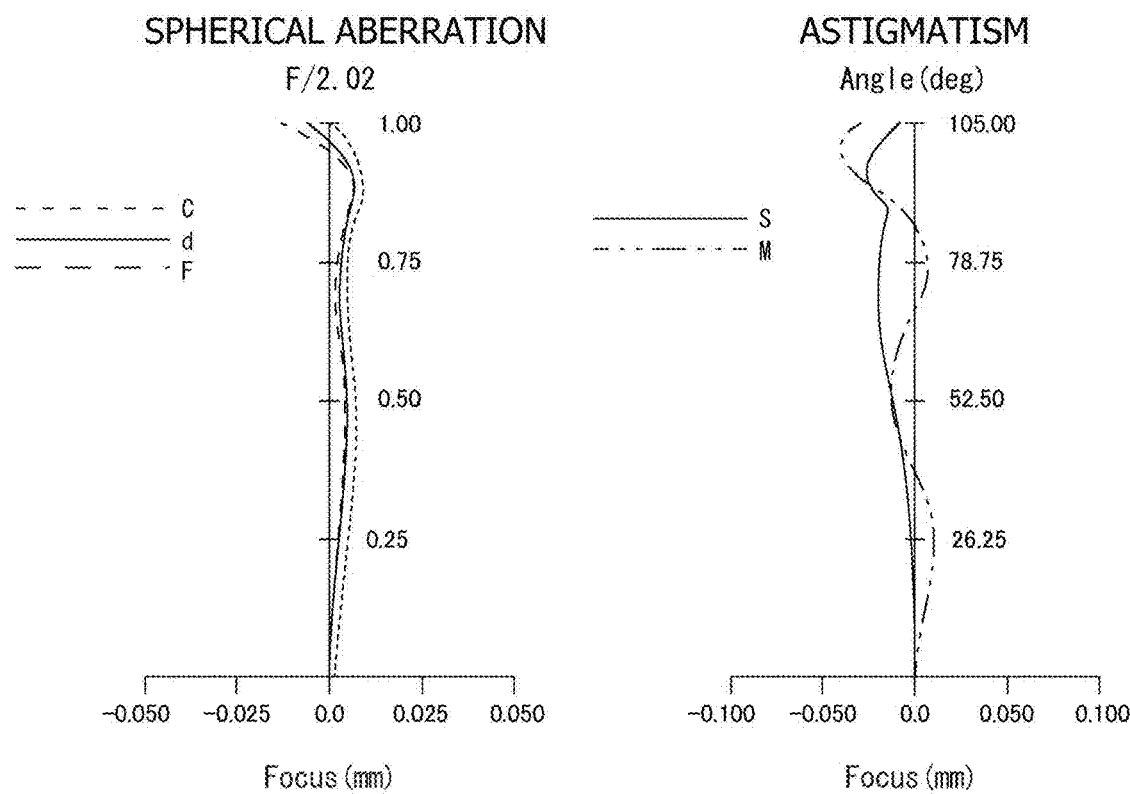
FIG. 12 is an aberration view depicting aberrations in Numerical Example 6 in which concrete numerical values are applied to the imaging lens depicted in FIG. 11.

The lens data of Numerical Example 6 in the imaging lens 6 depicted in FIG. 11 is depicted in TABLE 6-1, and the aspherical surface data thereof is depicted in TABLE 6-2. The total angle of view is 210 degrees, the F-value is 2.02, and the focal length f of the entire system of the imaging lens is 1.061 mm.

TABLE 6-1

| surface number | Ri | Di | Ndi | vdi |
|---|---|---|---|---|
| 1 | 14.600 | 1.300 | 1.589 | 61.3 |
| 2 | 3.728 | 1.219 | | |
| 3* | 150.337 | 0.800 | 1.544 | 55.5 |
| 4* | 1.512 | 1.219 | | |
| 5* | −3.598 | 1.500 | 1.64 | 23.5 |
| 6* | −1.949 | 0.475 | | |
| stop | ∞ | 0.635 | | |
| 8* | 3.202 | 1.250 | 1.544 | 55.5 |
| 9* | −1.391 | 0.147 | | |
| 10* | −2.020 | 0.700 | 1.64 | 23.5 |
| 11* | 1.512 | 0.115 | | |
| 12* | 1.982 | 1.250 | 1.544 | 55.5 |
| 13* | −1.698 | 0.670 | | |
| 14 | ∞ | 1.000 | 1.5168 | 64.2 |
| 15 | ∞ | 0.300 | | |
| IM | ∞ | 0.000 | | |

TABLE 6-2

| aspherical surface | Ki | AAi | ABi | ACi | ADi | AEi |
|---|---|---|---|---|---|---|
| 3 | 0 | −1.2856E−03 | 5.8118E−04 | −2.9891E−06 | −2.8012E−07 | 0 |
| 4 | −2.4425E−02 | −2.5483E−02 | −2.4818E−02 | 9.0800E−03 | −3.5442E−03 | 0 |
| 5 | 0 | −6.9276E−02 | −2.4862E−02 | 2.1961E−02 | −3.0822E−03 | 0 |

TABLE 6-2-continued

| aspherical surface | Ki | AAi | ABi | ACi | ADi | AEi |
|---|---|---|---|---|---|---|
| 6 | 0 | −1.3165E−02 | 2.6646E−02 | −1.1058E−02 | 2.7104E−03 | 0 |
| 8 | 0 | −2.2005E−02 | 7.6212E−02 | −9.6875E−02 | 3.4637E−02 | −1.7849E−02 |
| 9 | 0 | 4.8401E−02 | −7.5340E−02 | 3.2538E−02 | 7.0605E−03 | −5.7922E−03 |
| 10 | 0 | −1.0408E−01 | −6.1212E−02 | 2.4611E−02 | 1.8802E−02 | −6.0922E−04 |
| 11 | 0 | −1.7811E−01 | 5.8834E−02 | −2.6875E−02 | −1.7128E−03 | 5.3860E−04 |
| 12 | 0 | −6.4233E−02 | 2.5765E−02 | −1.2570E−02 | 0 | 0 |
| 13 | 0 | 4.6120E−02 | 1.9327E−03 | 9.9743E−03 | 0 | 0 |

Figure 13:
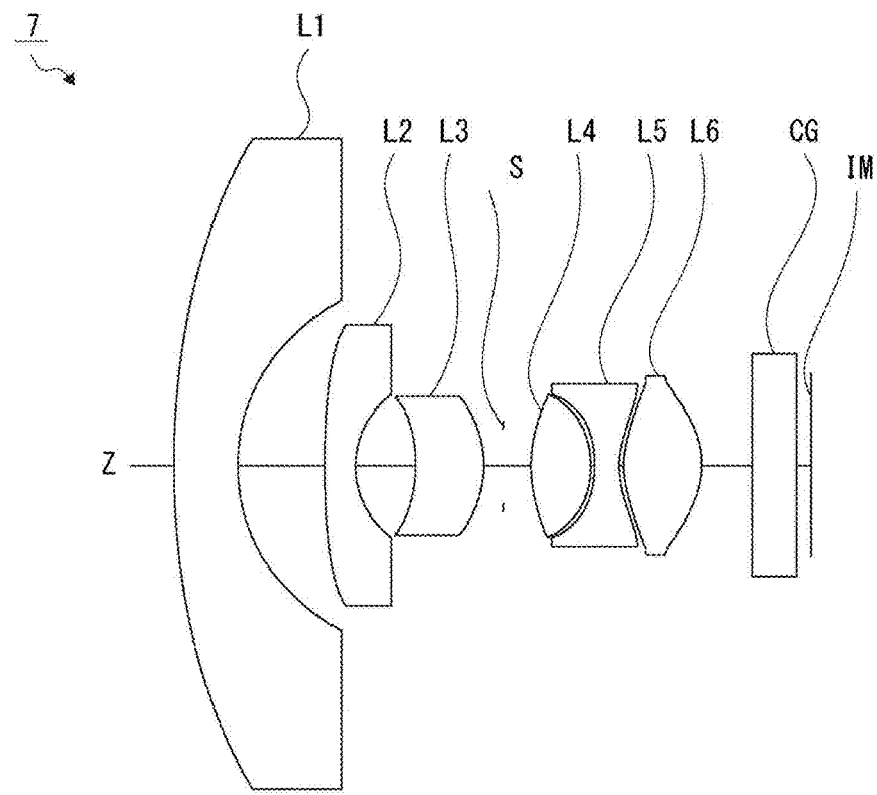
FIG. 13 is a cross-sectional view depicting Seventh Configuration Example of the imaging lens.
Figure 14:
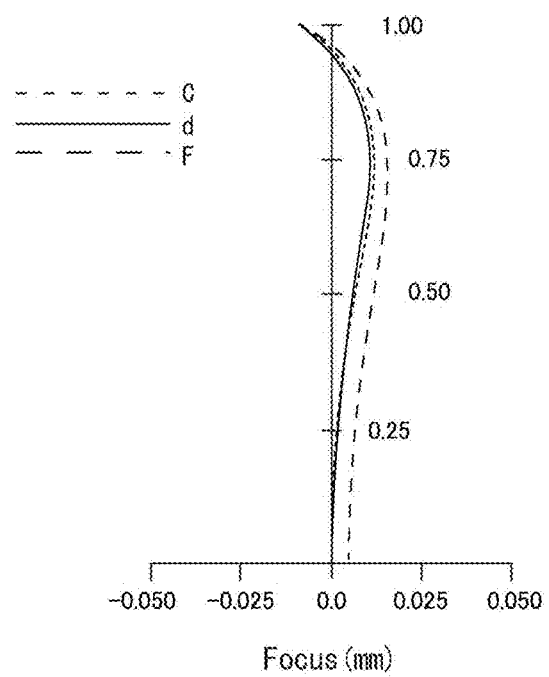
FIG. 14 is an aberration view depicting aberrations in Numerical Example 7 in which concrete numerical values are applied to the imaging lens depicted in FIG. 13.
Figure 14:
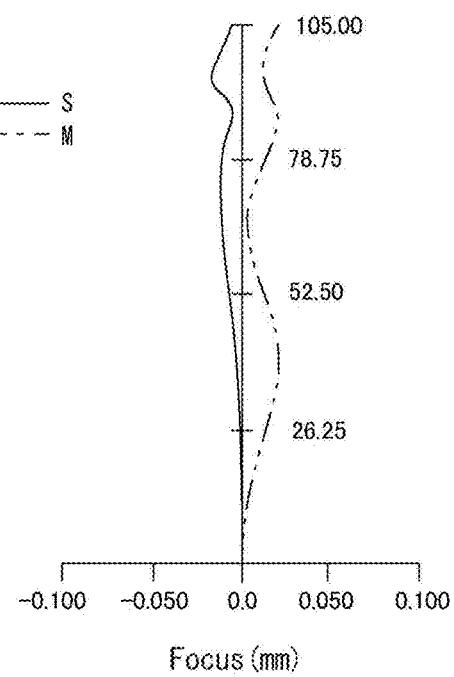

The lens data of Numerical Example 7 in the imaging lens 7 depicted in FIG. 13 is depicted in TABLE 7-1, and the aspherical surface data thereof is depicted in TABLE 7-2. The total angle of view is 210 degrees, the F-value is 2.05, and the focal length f of the entire system of the imaging lens is 1.045 mm.

TABLE 7-1

| surface number | Ri | Di | Ndi | vdi |
|---|---|---|---|---|
| 1 | 14.600 | 1.300 | 1.589 | 61.3 |
| 2 | 3.728 | 1.771 | | |
| 3* | 5000.000 | 0.582 | 1.544 | 55.5 |
| 4* | 1.541 | 1.300 | | |
| 5* | −3.051 | 1.345 | 1.64 | 23.5 |
| 6* | −2.126 | 0.384 | | |
| stop | ∞ | 0.584 | | |
| 8* | 3.111 | 1.254 | 1.544 | 55.5 |
| 9* | −1.534 | 0.066 | | |
| 10* | −2.452 | 0.480 | 1.64 | 23.5 |
| 11* | 1.836 | 0.053 | | |
| 12* | 2.036 | 1.616 | 1.544 | 55.5 |
| 13* | −1.883 | 1.001 | | |
| 14 | ∞ | 0.900 | 1.5168 | 64.2 |
| 15 | ∞ | 0.300 | | |
| IM | ∞ | 0.000 | | |

TABLE 7-2

| aspherical surface | Ki | AAi | ABi | ACi | ADi | AEi |
|---|---|---|---|---|---|---|
| 3 | 0 | 1.0699E−02 | −9.2638E−04 | 2.2140E−05 | 3.0406E−06 | 0 |
| 4 | 0 | −8.9024E−03 | 4.3580E−03 | −1.7244E−03 | −1.3503E−03 | 0 |
| 5 | 0 | −5.8009E−02 | 4.8223E−03 | 3.8441E−03 | −6.4467E−04 | 0 |
| 6 | 0 | −1.2365E−02 | 2.0117E−02 | −8.1333E−03 | 1.6764E−03 | 0 |
| 8 | 0 | −6.8753E−03 | 4.3350E−03 | 8.8663E−03 | −3.4129E−03 | 0 |
| 9 | 0 | −5.2651E−02 | 9.5986E−02 | −3.0973E−02 | 3.2241E−03 | 0 |
| 10 | 0 | −1.4356E−01 | 8.0078E−02 | −3.0400E−02 | 9.7771E−04 | 0 |
| 11 | 0 | −9.4785E−02 | 2.2268E−02 | −8.0751E−03 | 4.6429E−04 | 0 |
| 12 | 0 | −8.0829E−02 | 2.5940E−02 | −7.0775E−03 | 4.9970E−04 | 0 |
| 13 | 0 | 1.1293E−02 | 1.6412E−02 | 2.0493E−03 | 4.8272E−04 | 0 |

Figure 15:
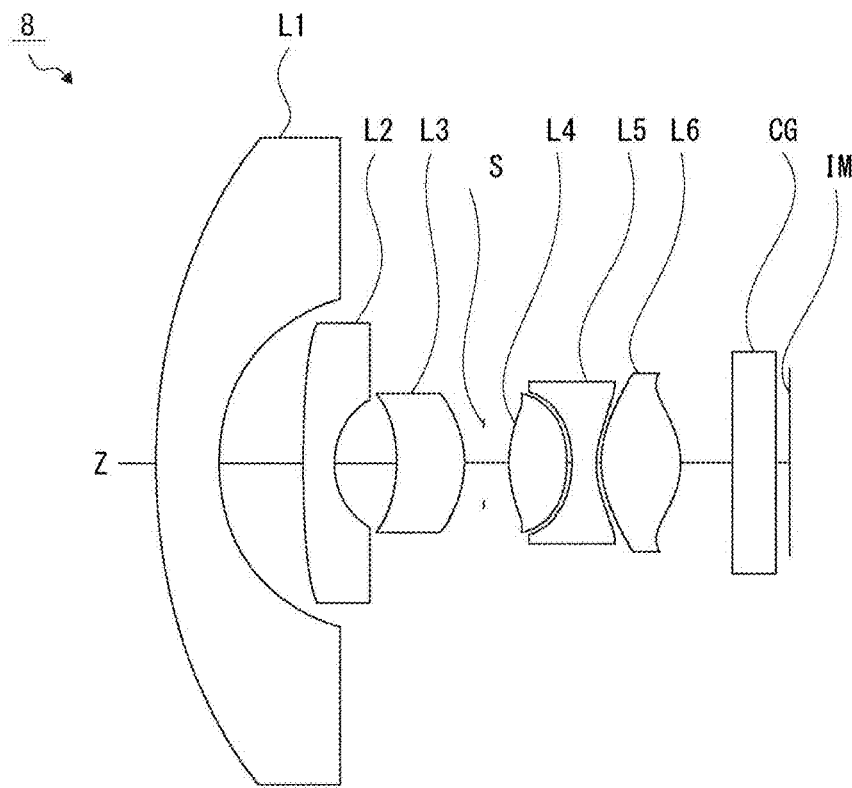
FIG. 15 is a cross-sectional view depicting Eighth Configuration Example of the imaging lens.
Figure 16:
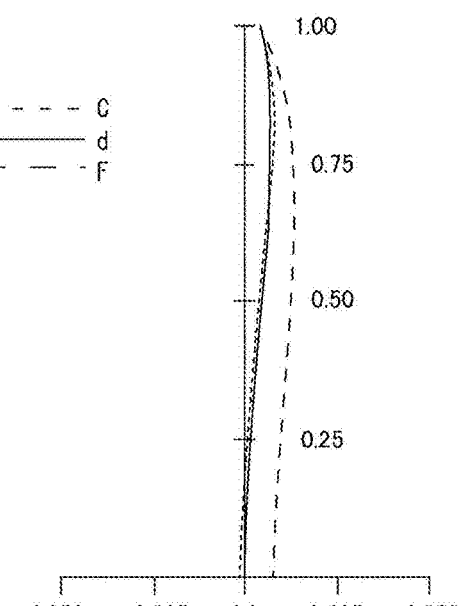
FIG. 16 is an aberration view depicting aberrations in Numerical Example 8 in which concrete numerical values are applied to the imaging lens depicted in FIG. 15.
Figure 16:
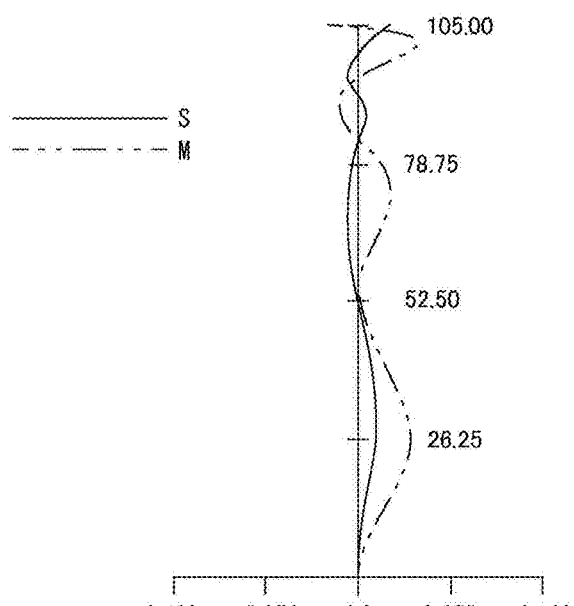

The lens data of Numerical Example 8 in the imaging lens 8 depicted in FIG. 15 is depicted in TABLE 8-1, and the aspherical surface data thereof is depicted in TABLE 8-2. The total angle of view is 210 degrees, the F-value is 2.05, and the focal length f of the entire system of the imaging lens is 1.061 mm.

TABLE 8-1

| surface number | Ri | Di | Ndi | vdi |
|---|---|---|---|---|
| 1 | 11.180 | 1.300 | 1.589 | 61.3 |
| 2 | 3.500 | 1.771 | | |
| 3* | 315.082 | 0.582 | 1.544 | 55.5 |
| 4* | 1.444 | 1.300 | | |

TABLE 8-1-continued

| surface number | Ri | Di | Ndi | vdi |
|---|---|---|---|---|
| 5* | −3.533 | 1.345 | 1.64 | 23.5 |
| 6* | −2.259 | 0.384 | | |
| stop | ∞ | 0.584 | | |
| 8* | 3.075 | 1.254 | 1.544 | 55.5 |
| 9* | −1.496 | 0.066 | | |
| 10* | −2.416 | 0.480 | 1.64 | 23.5 |
| 11* | 1.772 | 0.053 | | |
| 12* | 1.949 | 1.616 | 1.544 | 55.5 |
| 13* | −1.932 | 1.036 | | |
| 14 | ∞ | 0.900 | 1.5168 | 64.2 |
| 15 | ∞ | 0.300 | | |
| IM | ∞ | 0.000 | | |

TABLE 8-2

| aspherical surface | Ki | AAi | ABi | ACi | ADi | AEi |
|---|---|---|---|---|---|---|
| 3 | 0 | −4.9703E−03 | −4.4717E−04 | 2.5517E−05 | 3.8171E−07 | 0 |
| 4 | 0 | 2.4921E−02 | −4.6307E−02 | 3.4056E−02 | −1.3530E−02 | 0 |
| 5 | 0 | −4.1003E−02 | −2.0725E−02 | 1.0995E−02 | −2.9826E−04 | 0 |
| 6 | 0 | −1.7391E−02 | 1.6124E−02 | −7.8126E−03 | 2.6098E−03 | 0 |
| 8 | 0 | 1.2410E−02 | 1.5217E−02 | 3.8469E−03 | −8.8489E−03 | 0 |
| 9 | 0 | −3.1065E−02 | 1.0001E−01 | −3.7060E−02 | 3.5773E−04 | 0 |
| 10 | 0 | −1.3903E−01 | 8.1622E−02 | −3.6918E−02 | 1.7936E−03 | 0 |
| 11 | 0 | −1.1076E−01 | 1.9145E−02 | −6.1291E−03 | −2.9473E−04 | 0 |
| 12 | 0 | −8.3053E−02 | 2.5265E−02 | −6.3226E−03 | 4.9970E−04 | 0 |
| 13 | 0 | 5.7886E−03 | 2.7944E−03 | 4.3952E−03 | 4.8272E−04 | 0 |

Figure 17:
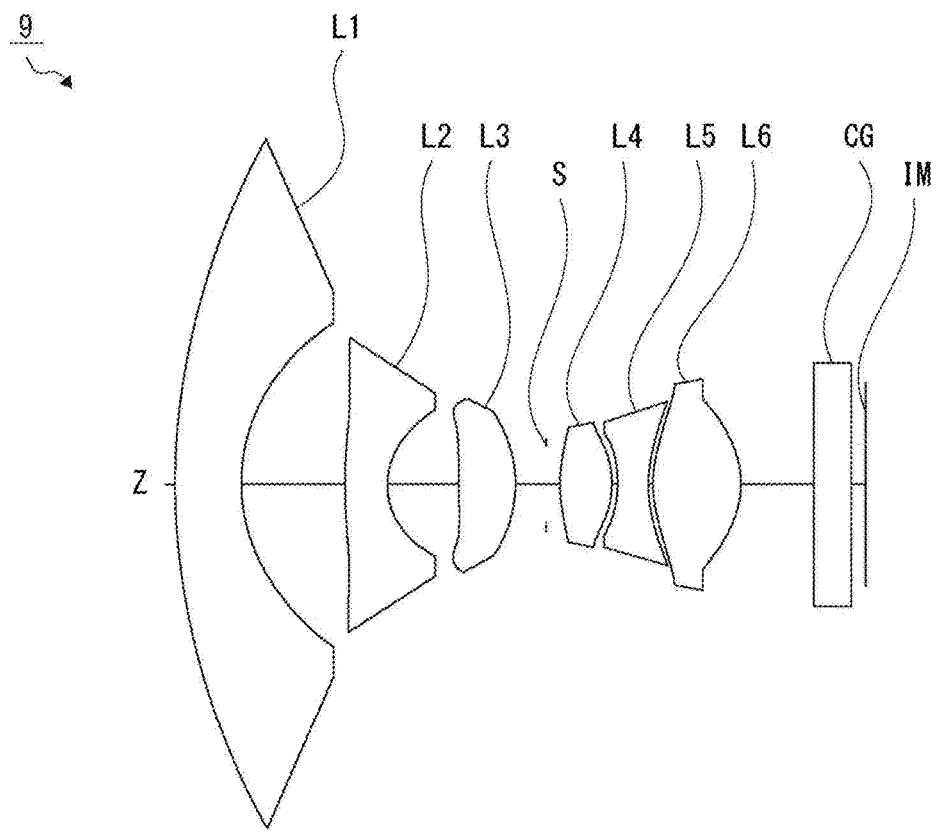
FIG. 17 is a cross-sectional view depicting Ninth Configuration Example of the imaging lens.
Figure 18:
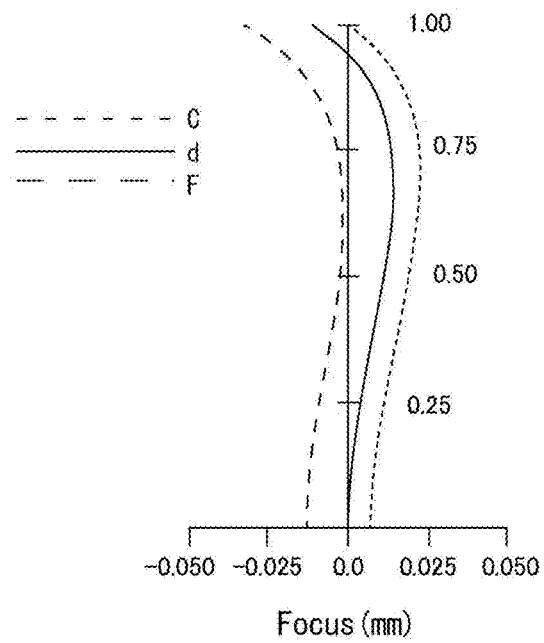
FIG. 18 is an aberration view depicting aberrations in Numerical Example 9 in which concrete numerical values are applied to the imaging lens depicted in FIG. 17.
Figure 18:
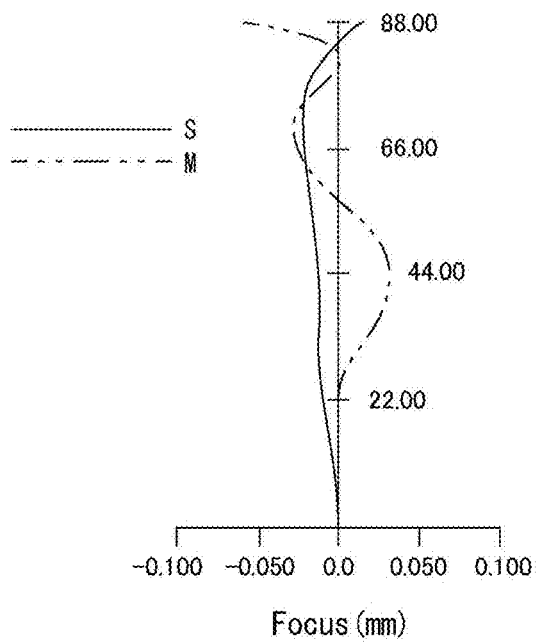

The lens data of Numerical Example 9 in the imaging lens 9 depicted in FIG. 17 is depicted in TABLE 9-1, and the aspherical surface data thereof is depicted in TABLE 9-2. The total angle of view is 176 degrees, the F-value is 2.03, and the focal length f of the entire system of the imaging lens is 1.216 mm.

TABLE 9-1

| surface number | Ri | Di | Ndi | vdi |
|---|---|---|---|---|
| 1 | 13.569 | 1.300 | 1.589 | 61.3 |
| 2 | 3.650 | 2.150 | | |
| 3* | 98.624 | 0.700 | 1.544 | 55.5 |
| 4* | 1.338 | 1.351 | | |
| 5* | −27278.203 | 1.100 | 1.64 | 23.5 |
| 6* | −2.518 | 0.600 | | |
| stop | ∞ | 0.300 | | |
| 8* | 7.814 | 1.000 | 1.544 | 55.5 |
| 9* | −1.547 | 0.100 | | |
| 10* | −2.822 | 0.600 | 1.64 | 23.5 |
| 11* | 1.833 | 0.100 | | |
| 12* | 2.382 | 1.720 | 1.544 | 55.5 |
| 13* | −1.766 | 1.408 | | |
| 14 | ∞ | 0.700 | 1.5168 | 64.2 |
| 15 | ∞ | 0.300 | | |
| IM | ∞ | 0.000 | | |

TABLE 9-2

| aspherical surface | Ki | AAi | ABi | ACi | ADi | AEi |
|---|---|---|---|---|---|---|
| 3 | 0 | 1.0692E−02 | −6.0533E−03 | 1.0291E−03 | −5.7869E−05 | 0 |
| 4 | −3.1979E−01 | −7.7877E−03 | 4.3438E−02 | −4.8994E−02 | 1.0893E−02 | 0 |
| 5 | 0 | −1.4406E−02 | 7.7010E−03 | −2.4962E−02 | 9.0226E−03 | 0 |
| 6 | 0 | 1.5956E−02 | −1.3966E−02 | 1.9556E−01 | 1.1704E−03 | 0 |
| 8 | 0 | 5.2317E−02 | −1.3799E−03 | −2.5696E−01 | 1.8067E−02 | 0 |
| 9 | 0 | 7.1073E−02 | 3.0487E−02 | −8.6434E−02 | 4.9762E−02 | 0 |
| 10 | 0 | −1.2261E−01 | 8.0645E−02 | −8.3711E−02 | 3.2647E−02 | 0 |

TABLE 9-2-continued

| aspherical surface | Ki | AAi | ABi | ACi | ADi | AEi |
|---|---|---|---|---|---|---|
| 11 | 0 | −1.7487E−01 | 9.0688E−02 | −2.8629E−02 | 2.4117E−03 | 0 |
| 12 | 0 | −7.0154E−02 | 1.3374E−02 | 1.5503E−03 | −7.9554E−04 | 0 |
| 13 | −4.5102E−01 | 1.5063E−02 | −2.1784E−03 | 2.9109E−03 | −2.2937E−03 | 5.8972E−04 |

Figure 19:
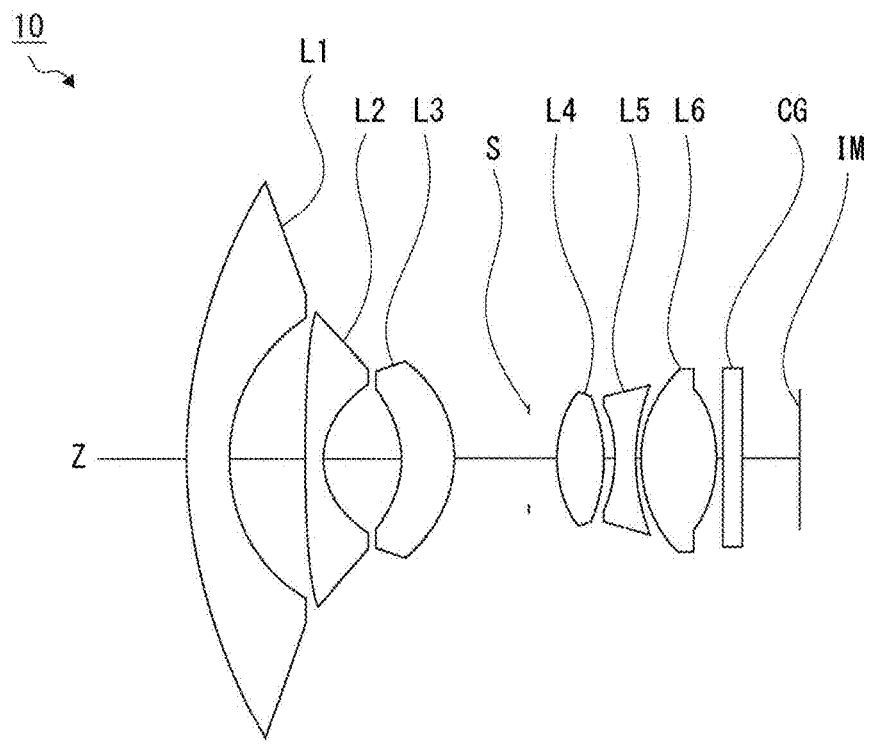
FIG. 19 is a cross-sectional view depicting Tenth Configuration Example of the imaging lens.
Figure 20:
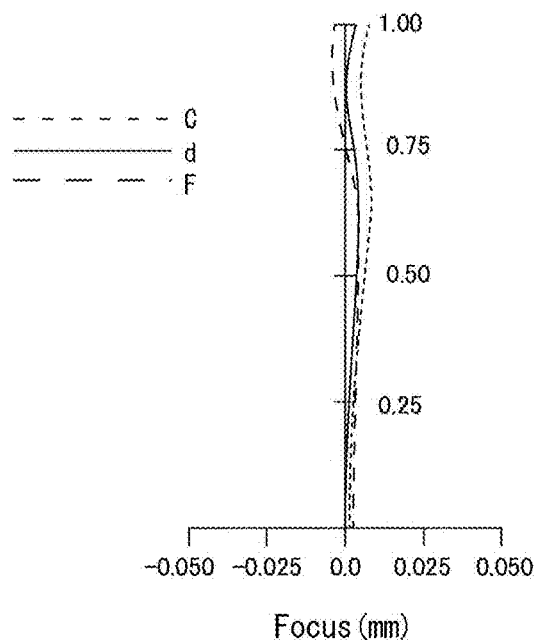
FIG. 20 is an aberration view depicting aberrations in Numerical Example 10 in which concrete numerical values are applied to the imaging lens depicted in FIG. 19.
Figure 20:
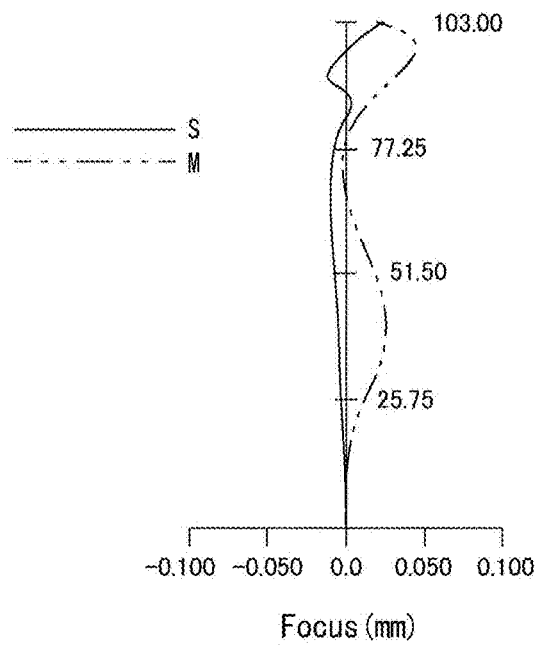

The lens data of Numerical Example 10 in the imaging lens 10 depicted in FIG. 19 is depicted in TABLE 10-1, and the aspherical surface data thereof is depicted in TABLE 10-2. The total angle of view is 206 degrees, the F-value is 1.46, and the focal length f of the entire system of the imaging lens is 1.388 mm.

TABLE 10-1

| surface number | Ri | Di | Ndi | vdi |
|---|---|---|---|---|
| 1 | 17.915 | 1.500 | 1.744 | 44.9 |
| 2 | 5.598 | 2.681 | | |
| 3* | 5000.000 | 0.710 | 1.544 | 55.5 |
| 4* | 2.820 | 2.717 | | |
| 5* | −4.875 | 2.000 | 1.64 | 23.5 |
| 6* | −3.804 | 2.676 | | |
| stop | ∞ | 0.995 | | |
| 8* | 4.458 | 1.700 | 1.544 | 55.5 |
| 9* | −3.525 | 0.413 | | |
| 10* | −6.606 | 0.640 | 1.64 | 23.5 |
| 11* | 2.760 | 0.253 | | |
| 12* | 3.420 | 2.800 | 1.59201 | 67.02 |
| 13* | −3.000 | 0.160 | | |
| 14 | ∞ | 0.700 | 1.5168 | 64.2 |
| 15 | ∞ | 2.063 | | |
| IM | ∞ | 0.000 | | |

TABLE 10-2

| aspherical surface | Ki | AAi | ABi | ACi | ADi | AEi |
|---|---|---|---|---|---|---|
| 3 | 0 | 2.0841E−03 | −1.1090E−04 | 1.5683E−06 | 2.3170E−08 | 0 |
| 4 | 0 | −9.6472E−05 | 1.4463E−03 | −5.6505E−04 | 1.0393E−04 | −8.6359E−06 |
| 5 | 0 | −4.0725E−03 | 5.2324E−04 | −1.8026E−04 | 1.3374E−05 | 0 |
| 6 | 0 | 5.2658E−04 | 5.1197E−05 | −1.0891E−05 | 1.6486E−06 | 0 |
| 8 | 0 | 3.7412E−03 | −1.3160E−04 | 2.1307E−04 | −1.6162E−05 | 0 |
| 9 | 0 | 2.1320E−02 | −5.9363E−03 | 1.5932E−03 | −1.6788E−04 | 0 |
| 10 | 0 | −6.5266E−03 | −5.5678E−03 | 1.4265E−03 | −1.8418E−04 | 0 |
| 11 | 0 | −2.4169E−02 | 9.4425E−04 | −5.5436E−05 | −1.5717E−05 | 0 |
| 12 | 0 | −8.0860E−03 | −5.6801E−05 | 7.9345E−05 | −5.9582E−06 | 0 |
| 13 | 0 | 6.6753E−03 | 4.7984E−04 | −2.2000E−05 | 1.6964E−05 | 0 |

Figure 21:
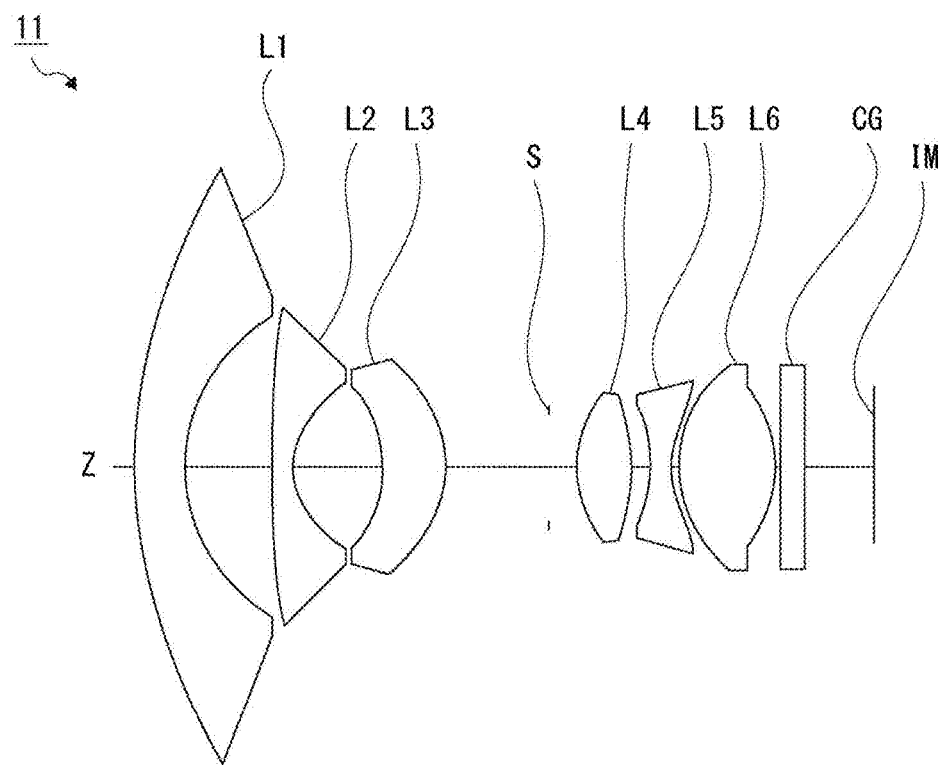
FIG. 21 is a cross-sectional view depicting Eleventh Configuration Example of the imaging lens.
Figure 22:
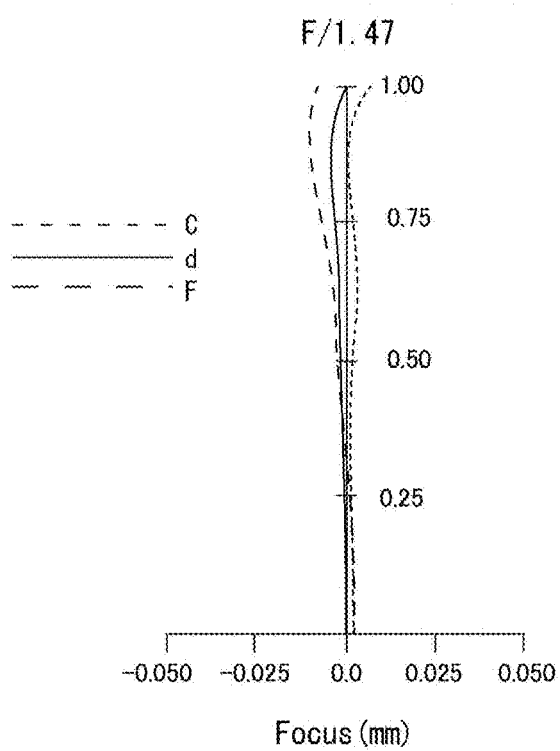
FIG. 22 is an aberration view depicting aberrations in Numerical Example 11 in which concrete numerical values are applied to the imaging lens depicted in FIG. 21.
Figure 22:
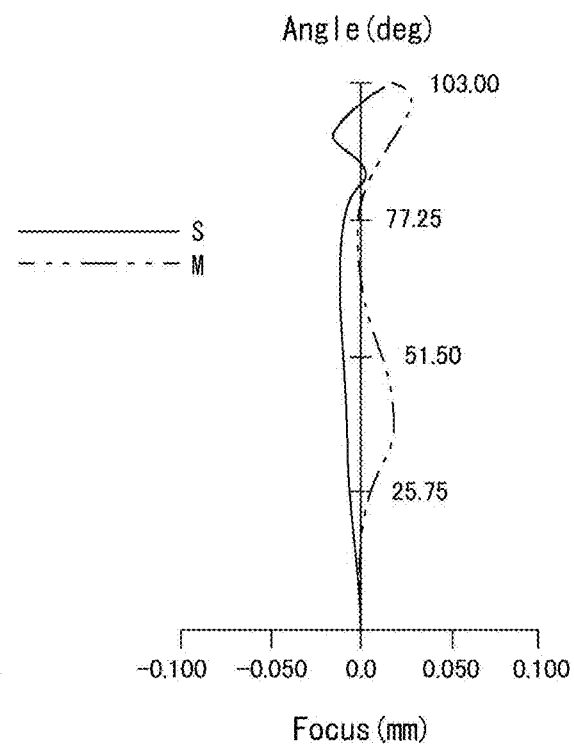

The lens data of Numerical Example 11 in the imaging lens 11 depicted in FIG. 21 is depicted in TABLE 11-1, and the aspherical surface data thereof is depicted in TABLE 11-2. The total angle of view is 206 degrees, the F-value is 1.47, and the focal length f of the entire system of the imaging lens is 1.377 mm.

TABLE 11-1

| surface number | Ri | Di | Ndi | vdi |
|---|---|---|---|---|
| 1 | 17.873 | 1.500 | 1.7725 | 49.62 |
| 2 | 5.469 | 2.639 | | |
| 3* | 5000.000 | 0.710 | 1.544 | 55.5 |
| 4* | 2.843 | 2.625 | | |
| 5* | −4.945 | 2.000 | 1.64 | 23.5 |
| 6* | −3.900 | 3.122 | | |

TABLE 11-1-continued

| surface number | Ri | Di | Ndi | vdi |
|---|---|---|---|---|
| stop | ∞ | 0.894 | | |
| 8* | 4.906 | 1.700 | 1.544 | 55.5 |
| 9* | −3.541 | 0.497 | | |
| 10* | −7.578 | 0.640 | 1.64 | 23.5 |
| 11* | 2.818 | 0.282 | | |
| 12* | 3.526 | 2.900 | 1.59201 | 67.02 |
| 13* | −3.077 | 0.160 | | |
| 14 | ∞ | 0.700 | 1.5168 | 64.2 |
| 15 | ∞ | 2.138 | | |
| IM | ∞ | 0.000 | | |

TABLE 11-2

| aspherical surface | Ki | AAi | ABi | ACi | ADi | AEi |
|---|---|---|---|---|---|---|
| 3 | 0 | 1.9742E−03 | −1.1365E−04 | 2.2153E−06 | 8.9141E−09 | 0 |
| 4 | 0 | −1.7627E−03 | 1.4991E−03 | −5.3758E−04 | 9.0122E−05 | −6.8962E−06 |
| 5 | 0 | −3.8751E−03 | 5.2056E−04 | −1.2901E−04 | 7.6716E−06 | 0 |
| 6 | 0 | 5.4741E−04 | 7.5972E−05 | −1.1282E−05 | 1.1587E−06 | 0 |
| 8 | 0 | 3.7729E−03 | −2.9689E−04 | 2.5032E−04 | −2.7452E−05 | 0 |
| 9 | 0 | 2.2115E−02 | −5.3750E−03 | 1.3425E−03 | −1.4308E−04 | 0 |
| 10 | 0 | −2.2913E−03 | −5.6631E−03 | 1.3669E−03 | −1.9033E−04 | 0 |
| 11 | 0 | −2.1980E−02 | 6.2264E−04 | −2.9195E−05 | −1.7161E−05 | 0 |
| 12 | 0 | −6.8361E−03 | −8.8852E−05 | 6.7149E−05 | −4.5116E−06 | 0 |
| 13 | 0 | 7.0981E−03 | 2.9177E−04 | −1.9359E−05 | 1.5074E−05 | 0 |

Figure 23:
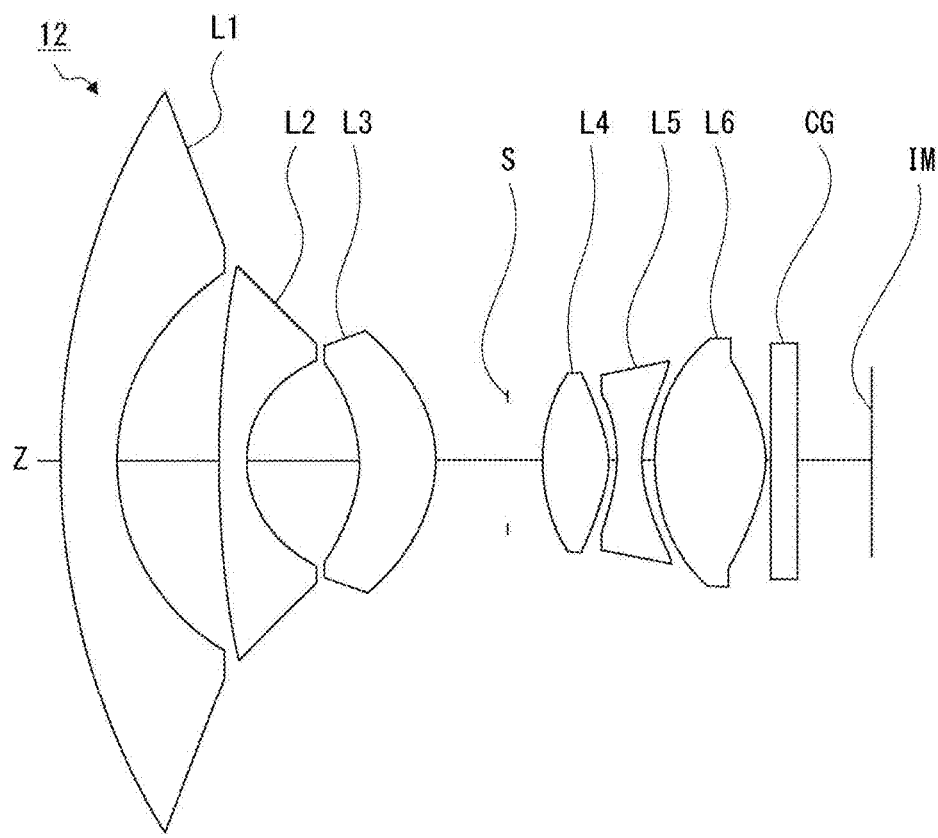
FIG. 23 is a cross-sectional view depicting Twelfth Configuration Example of the imaging lens.
Figure 24:
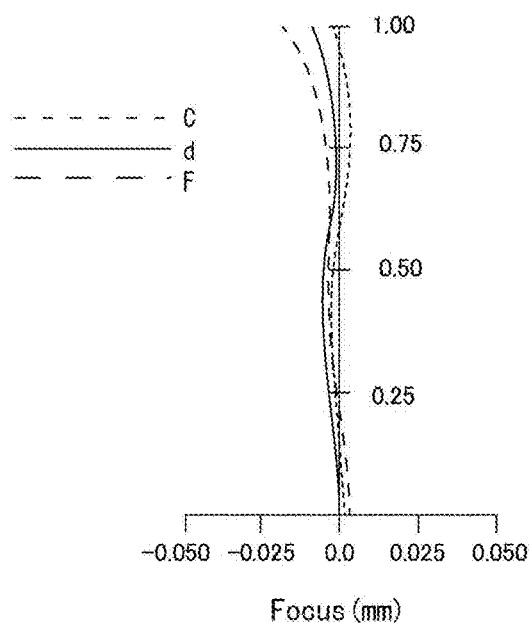
FIG. 24 is an aberration view depicting aberrations in Numerical Example 12 in which concrete numerical values are applied to the imaging lens depicted in FIG. 23.
Figure 24:
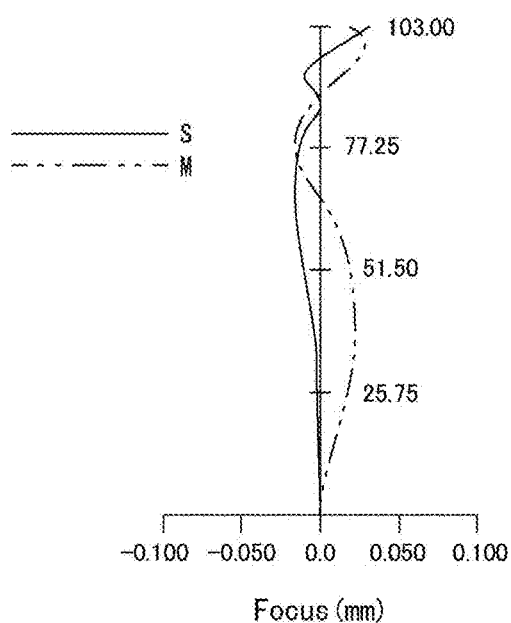

The lens data of Numerical Example 12 in the imaging lens 12 depicted in FIG. 23 is depicted in TABLE 12-1, and the aspherical surface data thereof is depicted in TABLE 12-2. The total angle of view is 206 degrees, the F-value is 1.43, and the focal length f of the entire system of the imaging lens is 1.407 mm.

TABLE 12-1

| surface number | Ri | Di | Ndi | vdi |
|---|---|---|---|---|
| 1 | 17.909 | 1.500 | 1.7725 | 49.62 |
| 2 | 5.645 | 2.612 | | |
| 3* | 5000.000 | 0.710 | 1.544 | 55.5 |
| 4* | 2.830 | 2.878 | | |
| 5* | −5.137 | 2.000 | 1.64 | 23.5 |
| 6* | −3.603 | 1.926 | | |
| stop | ∞ | 0.850 | | |
| 8* | 4.604 | 1.700 | 1.544 | 55.5 |
| 9* | −2.975 | 0.224 | | |
| 10* | −5.530 | 0.640 | 1.64 | 23.5 |
| 11* | 2.752 | 0.308 | | |
| 12* | 3.339 | 2.900 | 1.59201 | 67.02 |
| 13* | −3.082 | 0.160 | | |
| 14 | ∞ | 0.700 | 1.5168 | 64.2 |
| 15 | ∞ | 1.898 | | |
| IM | ∞ | 0.000 | | |

TABLE 12-2

| aspherical surface | Ki | AAi | ABi | ACi | ADi | AEi |
|---|---|---|---|---|---|---|
| 3 | 0 | 3.1346E−03 | −1.5902E−04 | 1.2542E−06 | 5.3177E−08 | 0 |
| 4 | 0 | 5.6022E−03 | −1.5964E−04 | −1.4340E−05 | 3.9426E−05 | −6.8962E−06 |
| 5 | 0 | −4.5050E−03 | −3.8933E−04 | −1.7346E−04 | 1.3536E−05 | 0 |
| 6 | 0 | 6.0523E−04 | 1.4028E−04 | −1.7990E−05 | 2.4343E−06 | 0 |
| 8 | 0 | 2.7048E−03 | −1.0313E−04 | 1.7257E−04 | −1.3905E−05 | 0 |
| 9 | 0 | 2.3799E−02 | −6.2918E−03 | 1.5517E−03 | −1.4574E−04 | 0 |
| 10 | 0 | −2.0156E−03 | −5.9220E−03 | 1.3440E−03 | −1.3783E−04 | 0 |
| 11 | 0 | −2.1565E−02 | 4.2991E−04 | 3.1232E−05 | −2.0325E−05 | 0 |
| 12 | 0 | −9.8439E−03 | 6.6088E−05 | 7.1416E−05 | −6.8059E−06 | 0 |
| 13 | 0 | 5.4562E−03 | 5.6331E−04 | −3.7914E−05 | 1.3595E−05 | 0 |

Hereinafter, values of main specifications, and the conditional expression (1) to the conditional expression (11) of Numerical Example 1 to Numerical Example 12 are depicted in TABLE 13.

TABLE 13

| | | Example 1 | Example 2 | Example 3 | Example 4 | Example 5 | Example 6 |
|---|---|---|---|---|---|---|---|
| specification | total angle of view | 176 | 176 | 176 | 210 | 210 | 210 |
| specification | F-value | 2.05 | 2.05 | 2.03 | 2.02 | 2.02 | 2.02 |
| specification | entire system focal length (f) | 1.048 | 1.042 | 1.141 | 1.046 | 1.050 | 1.061 |
| con. exp. (1) | vd1 | 61.3 | 50.9 | 61.3 | 61.3 | 50.9 | 61.3 |
| con. exp. (2) | Nd1 | 1.589 | 1.658 | 1.589 | 1.589 | 1.656 | 1.589 |
| con. exp. (3) | f456/f | 2.607 | 2.713 | 2.508 | 2.863 | 2.917 | 2.796 |
| con. exp. (4) | (R10 + R11)/(R10 − R11) | −0.161 | −0.191 | −0.168 | 0.154 | 0.213 | 0.144 |
| con. exp. (5) | R6/f | −2.460 | −2.519 | −3.239 | −1.775 | −1.954 | −1.838 |
| con. exp. (6) | (R8 + R9)/(R8 − R9) | 0.158 | 0.189 | 0.381 | 0.412 | 0.306 | 0.394 |
| con. exp. (7) | f5/f | −1.603 | −1.574 | −1.312 | −1.213 | −1.289 | −1.210 |
| con. exp. (8) | R1/f | 13.935 | 13.325 | 15.726 | 12.711 | 11.883 | 13.766 |
| con. exp. (9) | L/f | 12.010 | 12.510 | 11.656 | 11.875 | 12.394 | 11.706 |
| con. exp. (10) | f6/f | 2.152 | 2.205 | 2.012 | 1.873 | 1.938 | 1.842 |
| con. exp. (11) | R12/f | 2.568 | 2.585 | 1.942 | 1.906 | 1.886 | 1.868 |
| | f456 | 2.7315 | 2.8262 | 2.86027 | 2.99474 | 3.06294 | 2.96491 |
| | f5 | −1.67943 | −1.63955 | −1.49876 | −1.26844 | −1.35291 | −1.28317 |
| | L | 12.5826 | 13.0332 | 13.2947 | 12.4227 | 13.013 | 12.4151 |
| | f6 | 2.26524 | 2.29716 | 2.29492 | 1.95976 | 2.03433 | 1.95309 |

| | | Example 7 | Example 8 | Example 9 | Example 10 | Example 11 | Example 12 |
|---|---|---|---|---|---|---|---|
| specification | total angle of view | 210 | 210 | 176 | 206 | 206 | 206 |
| specification | F-value | 2.05 | 2.05 | 2.03 | 1.46 | 1.47 | 1.43 |
| specification | entire system focal length (f) | 1.045 | 1.061 | 1.216 | 1.388 | 1.377 | 1.407 |
| con. exp. (1) | vd1 | 61.3 | 61.3 | 61.3 | 44.9 | 49.6 | 49.6 |
| con. exp. (2) | Nd1 | 1.589 | 1.589 | 1.589 | 1.744 | 1.773 | 1.773 |
| con. exp. (3) | f456/f | 2.676 | 2.638 | 2.515 | 3.178 | 3.281 | 3.048 |
| con. exp. (4) | (R10 + R11)/(R10 − R11) | 0.144 | 0.154 | 0.212 | 0.411 | 0.458 | 0.335 |
| con. exp. (5) | R6/f | −2.035 | −2.128 | −2.071 | −2.740 | −2.832 | −2.581 |
| con. exp. (6) | (R8 + R9)/(R8 − R9) | 0.339 | 0.345 | 0.670 | 0.117 | 0.162 | 0.215 |
| con. exp. (7) | f5/f | −1.505 | −1.441 | −1.360 | −2.134 | −2.277 | −1.881 |
| con. exp. (8) | R1/f | 13.975 | 10.535 | 11.161 | 12.904 | 12.980 | 12.731 |
| con. exp. (9) | L/f | 12.363 | 12.224 | 11.073 | 15.851 | 16.345 | 14.933 |
| con. exp. (10) | f6/f | 2.014 | 1.970 | 1.796 | 2.321 | 2.409 | 2.313 |
| con. exp. (11) | R12/f | 1.949 | 1.837 | 1.959 | 2.463 | 2.561 | 2.373 |
| | f456 | 2.79588 | 2.79919 | 3.05762 | 4.41289 | 4.5176 | 4.28773 |
| | f5 | −1.57187 | −1.52969 | −1.65329 | −2.96272 | −3.13474 | −2.78708 |
| | L | 12.9364 | 12.9721 | 13.4624 | 22.0068 | 22.506 | 21.0061 |
| | f6 | 2.10398 | 2.09049 | 2.18332 | 3.22211 | 3.31704 | 3.25357 |

As depicted in TABLE 13, Numerical Example 1 to Numerical Example 12 fulfill all the conditional expression (1) to the conditional expression (11).

The spherical aberrations and the astigmatisms of Numerical Example 1 to Numerical Example 12 are depicted in FIG. 2, FIG. 4, FIG. 6, FIG. 8, FIG. 10, FIG. 12, FIG. 14, FIG. 16, FIG. 18, FIG. 20, FIG. 22, and FIG. 24. In each of the figures, in the spherical aberration, a short dotted line depicts values of a C-line (656.27 nm), a solid line depicts a d-line (587.56 nm), and a long dotted line depicts an F-line (486.13 nm). In addition, in the astigmatism, a solid line depicts values of a sagittal image surface of the d-line, and a broken line depicts values of a meridional image surface of the d-line.

It is obvious from the aberration diagrams that Numerical Example 1 to Numerical Example 12 are satisfactorily corrected in aberrations thereof, and have the excellent imaging performance.

[Installation Examples as On-Board Use Applications]

Figure 25:
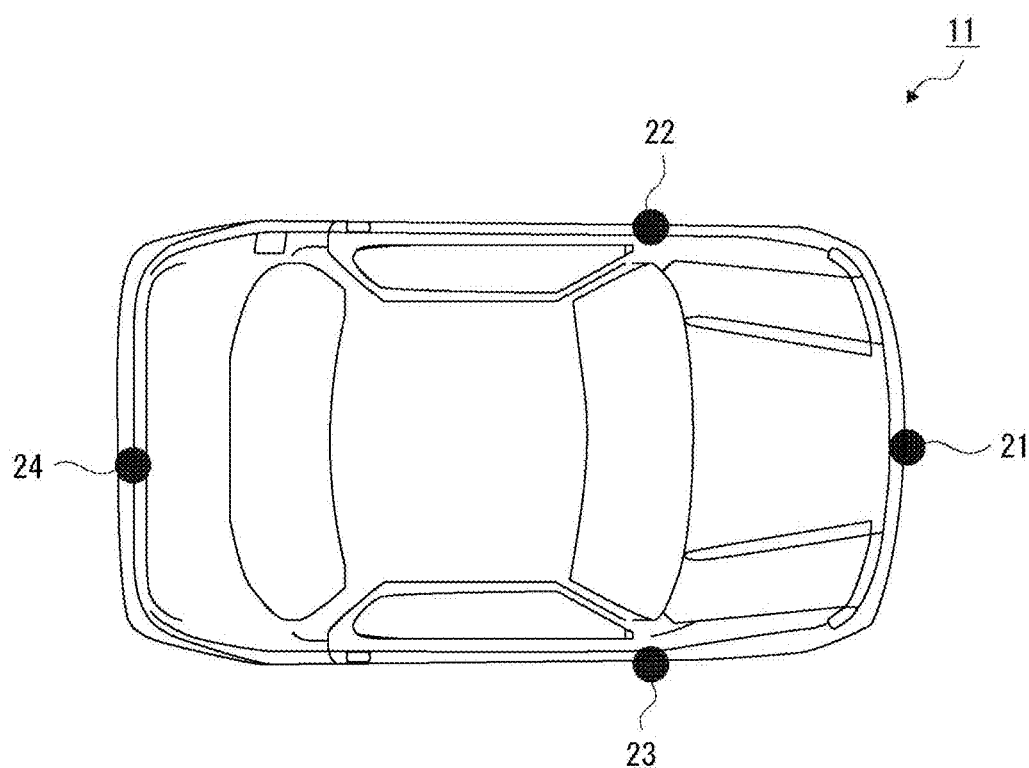
FIG. 25 is an explanatory view depicting Installation Example 1 as an on-board use application.
Figure 26:
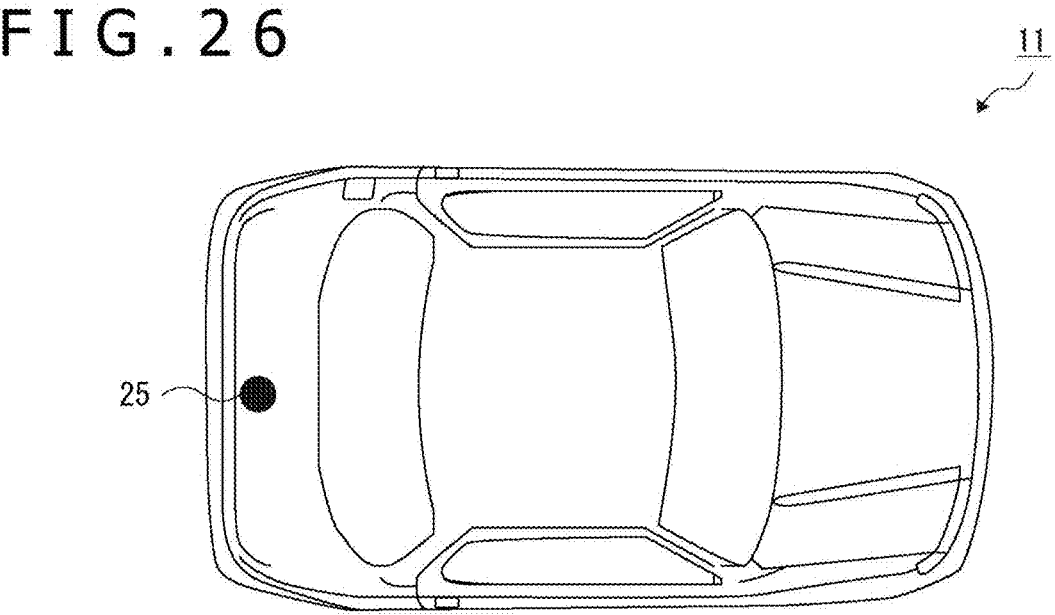
FIG. 26 is an explanatory view depicting Installation Example 2 as an on-board use application.

Installation Example 1 as an on-board use application is depicted in FIG. 25, and Installation Example 2 is depicted in FIG. 26.

Installation Example 1 as an on-board use application is Installation Example in which four cameras using the imaging cameras, capture an image of 360 degrees around a vehicle 11. For example, a camera 21 is installed in the front, a camera 22 and a camera 23 are installed in side surfaces, and a camera 24 is installed in the rear. Images captured by the cameras 21, 22, 23, and 24 are synthesized, thereby obtaining the image of 360 degrees. A lens having a specification in which the total angle of view is 200 degrees or more, and a horizontal total angle of view is 180 degrees or more is desirably used as the imaging lens.

Installation Example 2 as an on-board use application is Installation Example in which an image in the rear of the vehicle 11 is captured by one camera. For example, a camera 25 is installed in the rear. A lens having a specification in which a total angle of view is equal to or larger than 150 degrees and equal to or smaller than 190 degrees, and a horizontal angle of view is equal to or larger than 120 degrees and equal to or smaller than 160 degrees is desirably used as the imaging lens.

[Others]

In the imaging lens of the present technique, other optical element such as a lens having no refracting power may be arranged in addition to the first lens L1 to the sixth lens L6. In this case, the lens configuration of the imaging lens of the present technique is made a lens configuration substantially having six sheets of lenses of the first lens L1 to the sixth lens L6.

[The Present Technique]

The present technique can also be configured as follows.

<1>

An imaging lens, including:

a first lens having a negative refracting power and having a meniscus shape in which a convex surface is directed toward an object side;

a second lens having a negative refracting power and having a meniscus shape in which a convex surface is directed toward the object side;

a third lens having a positive refracting power and having a meniscus shape in which a concave surface is directed toward the object side;

an aperture stop;

a fourth lens having a positive refracting power and having a bi-convex shape;

a fifth lens having a negative refracting power and having a bi-concave shape; and a sixth lens having a positive refracting power and having a bi-convex shape, the first lens, the second lens, the third lens, the aperture stop, the fourth lens, the fifth lens, and the sixth lens being arranged in order from the object side to an image surface side, the imaging lens including six groups and sixth sheets of independent lenses as a whole, the total angle of view being set to 150 degrees or more, following conditional expression (1), conditional expression (2), and conditional expression (3) being fulfilled, $$44 < vd1 \tag{1}$$

$$Nd1 < 1.78 \tag{2}$$

$$2.505 < f456/f < 3.5 \tag{3}$$

where vd1: an Abbe's number in a d-line of the first lens

Nd1: a refractive index in the d-line of the first lens f456: a synthetic focal length of the fourth lens, the fifth lens, and the six lens f: a focal length of an entire system.

<2>

The imaging lens according to <1> described above, in which a following conditional expression (4) is fulfilled.

$$-0.25 < (R10+R11)/(R10-R11) < 0.6 \tag{4}$$

where

R10: a curvature radius on the optical axis of the surface on the object side of the fifth lens R11: a curvature radius on the optical axis of the surface on an image side of the fifth lens

<3>

The imaging lens according to <1> or <2> described above, in which a following conditional expression (5) is fulfilled.

$$-4 < R6/f < -1 \tag{5}$$

where

R6: a curvature radius on the optical axis of the surface on the image side of the third lens f: a focal length of an entire system

<4>

The imaging lens according to any one of <1> to <3> described above, in which a following conditional expression (6) is fulfilled.

$$0.1 < (R8+R9)/(R8-R9) < 0.8 \tag{6}$$

where

R8: a curvature radius on the optical axis of the surface on the object side of the fourth lens R9: a curvature radius on the optical axis of the surface on the image side of the fourth lens

<5>

The imaging lens according to any one of <1> to <4> described above, in which a following conditional expression (7) is fulfilled.

$$-2.3 < f5/f < -1.1 \tag{7}$$

where f5: a focal length of the fifth lens f: a focal length of an entire system <6>
An imaging lens, including:
a first lens having a negative refracting power and having a meniscus shape in which a convex surface is directed toward an object side;
a second lens having a negative refracting power and having a meniscus shape in which a convex surface is directed toward the object side;
a third lens having a positive refracting power and having a meniscus shape in which a concave surface is directed toward the object side;
an aperture stop;
a fourth lens having a positive refracting power and having a bi-convex shape;
a fifth lens having a negative refracting power and having a bi-concave shape; and
a sixth lens having a positive refracting power and having a bi-convex shape,
the first lens, the second lens, the third lens, the aperture stop, the fourth lens, the fifth lens, and the sixth lens being arranged in order from the object side to an image surface side,
the imaging lens including six groups and sixth sheets of independent lenses as a whole,
the total angle of view being set to 150 degrees or more,
following conditional expression (1), conditional expression (2), and conditional expression (8) being fulfilled, $$44 < vd1 \qquad (1)$$

$$Nd1 < 1.78 \qquad (2)$$

$$10.5 < R1/f < 16 \qquad (8)$$

where
vd1: an Abbe's number in a d-line of the first lens
Nd1: a refractive index in the d-line of the first lens
R1: a curvature radius on an optical axis of a surface on the object side of the first lens
f: a focal length of an entire system.
<7>
The imaging lens according to <6> described above, in which a following conditional expression (4) is fulfilled.

$$-0.25 < (R10+R11)/(R10-R11) < 0.6 \qquad (4)$$

where
R10: a curvature radius on the optical axis of the surface on the object side of the fifth lens
R11: a curvature radius on the optical axis of the surface on an image side of the fifth lens
<8>
The imaging lens according to <6> or <7> described above, in which a following conditional expression (5) is fulfilled.

$$-4 < R6/f < -1 \qquad (5)$$

where
R6: a curvature radius on the optical axis of the surface on the image side of the third lens
f: a focal length of an entire system
<9>
The imaging lens according to any one of <6> to <8> described above, in which a following conditional expression (6) is fulfilled.

$$0.1 < (R8+R9)/(R8-R9) < 0.8 \qquad (6)$$

where
R8: a curvature radius on the optical axis of the surface on the object side of the fourth lens
R9: a curvature radius on the optical axis of the surface on the image side of the fourth lens
<10>
The imaging lens according to any one of <6> to <9> described above, in which a following conditional expression (7) is fulfilled.

$$-2.3 < f5/f < -1.1 \qquad (7)$$

where
f5: a focal length of the fifth lens
f: a focal length of an entire system
<11>
An imaging lens, including:
a first lens having a negative refracting power and having a meniscus shape in which a convex surface is directed toward an object side;
a second lens having a negative refracting power and having a meniscus shape in which a convex surface is directed toward the object side;
a third lens having a positive refracting power and having a meniscus shape in which a concave surface is directed toward the object side;
an aperture stop;
a fourth lens having a positive refracting power and having a bi-convex shape;
a fifth lens having a negative refracting power and having a bi-concave shape; and
a sixth lens having a positive refracting power and having a bi-convex shape,
the first lens, the second lens, the third lens, the aperture stop, the fourth lens, the fifth lens, and the sixth lens being arranged in order from the object side to an image surface side,
the imaging lens including six groups and sixth sheets of independent lenses as a whole,
the total angle of view being set to 150 degrees or more,
following conditional expression (1), conditional expression (2), and conditional expression (9) being fulfilled, $$44 < vd1 \qquad (1)$$

$$Nd1 < 1.78 \qquad (2)$$

$$10.7 < L/f < 16.5 \qquad (9)$$

where
vd1: an Abbe's number in a d-line of the first lens
Nd1: a refractive index in the d-line of the first lens
L: a distance from a vertex on the optical axis of the surface on the object side of the first lens to the image surface
f: a focal length of an entire system.
<12>
The imaging lens according to <11> described above, in which a following conditional expression (4) is fulfilled.

$$-0.25 < (R10+R11)/(R10-R11) < 0.6 \qquad (4)$$

where
R10: a curvature radius on the optical axis of the surface on the object side of the fifth lens
R11: a curvature radius on the optical axis of the surface on an image side of the fifth lens
<13>
The imaging lens according to <11> or <12> described above, in which a following conditional expression (5) is fulfilled.

$$-4 < R6/f < -1 \qquad (5)$$

where
R6: a curvature radius on the optical axis of the surface on the image side of the third lens
f: a focal length of an entire system
<14>
The imaging lens according to any one of <11> to <13> described above, in which a following conditional expression (6) is fulfilled.

$$0.1<(R8+R9)/(R8-R9)<0.8 \qquad (6)$$

where
R8: a curvature radius on the optical axis of the surface on the object side of the fourth lens
R9: a curvature radius on the optical axis of the surface on the image side of the fourth lens
<15>
The imaging lens according to any one of <11> to <14> described above, in which a following conditional expression (7) is fulfilled.

$$-2.3<f5/f<-1.1 \qquad (7)$$

where
f5: a focal length of the fifth lens
f: a focal length of an entire system
<16>
An imaging lens, including:
a first lens having a negative refracting power and having a meniscus shape in which a convex surface is directed toward an object side;
a second lens having a negative refracting power and having a meniscus shape in which a convex surface is directed toward the object side;
a third lens having a positive refracting power and having a meniscus shape in which a concave surface is directed toward the object side;
an aperture stop;
a fourth lens having a positive refracting power and having a bi-convex shape;
a fifth lens having a negative refracting power and having a bi-concave shape; and
a sixth lens having a positive refracting power and having a bi-convex shape,
the first lens, the second lens, the third lens, the aperture stop, the fourth lens, the fifth lens, and the sixth lens being arranged in order from the object side to an image surface side,
the imaging lens including six groups and sixth sheets of independent lenses as a whole,
the total angle of view being set to 150 degrees or more,
a following conditional expression (10) being fulfilled, $$1.77<f6/f<2.415 \qquad (10)$$

where
f6: a focal length of the sixth lens
f: a focal length of an entire system.
<17>
The imaging lens according to <16> described above, in which a following conditional expression (4) is fulfilled.

$$-0.25<(R10+R11)/(R10-R11)<0.6 \qquad (4)$$

where
R10: a curvature radius on the optical axis of the surface on the object side of the fifth lens
R11: a curvature radius on the optical axis of the surface on an image side of the fifth lens <18>
The imaging lens according to <16> or <17> described above, in which a following expression (5) is fulfilled.

$$-4<R6/f<-1 \qquad (5)$$

where
R6: a curvature radius on the optical axis of the surface on the image side of the third lens
f: a focal length of an entire system
<19>
The imaging lens according to any one of <16> to <18> described above, in which a following conditional expression (6) is fulfilled.

$$0.1<(R8+R9)/(R8-R9)<0.8 \qquad (6)$$

where
R8: a curvature radius on the optical axis of the surface on the object side of the fourth lens
R9: a curvature radius on the optical axis of the surface on the image side of the fourth lens
<20>
The imaging lens according to any one of <16> to <19> described above, in which a following conditional expression (7) is fulfilled.

$$-2.3<f5/f<-1.1 \qquad (7)$$

where
f5: a focal length of the fifth lens
f: a focal length of an entire system
<21>
An imaging lens, including:
a first lens having a negative refracting power and having a meniscus shape in which a convex surface is directed toward an object side;
a second lens having a negative refracting power and having a meniscus shape in which a convex surface is directed toward the object side;
a third lens having a positive refracting power and having a meniscus shape in which a concave surface is directed toward the object side;
an aperture stop;
a fourth lens having a positive refracting power and having a bi-convex shape;
a fifth lens having a negative refracting power and having a bi-concave shape; and
a sixth lens having a positive refracting power and having a bi-convex shape,
the first lens, the second lens, the third lens, the aperture stop, the fourth lens, the fifth lens, and the sixth lens being arranged in order from the object side to an image surface side,
the imaging lens including six groups and sixth sheets of independent lenses as a whole,
the total angle of view being set to 150 degrees or more,
a following conditional expression (11) being fulfilled, $$1.75<R12/f<2.7 \qquad (11)$$

where
R12: a curvature radius on the optical axis of the surface on the object side of the sixth lens
f: a focal length of an entire system.
<22>
The imaging lens according to <21> described above, in which a following conditional expression (4) is fulfilled.

$$-0.25<(R10+R11)/(R10-R11)<0.6 \qquad (4)$$

where
R10: a curvature radius on the optical axis of the surface on the object side of the fifth lens R11: a curvature radius on the optical axis of the surface on an image side of the fifth lens

<23>

The imaging lens according to <21> or <22> described above, in which a following conditional expression (5) is fulfilled.

$$-4<R6/f<-1 \tag{5}$$

where

R6: a curvature radius on the optical axis of the surface on the image side of the third lens f: a focal length of an entire system

<24>

The imaging lens according to any one of <21> to <23> described above, in which a following conditional expression (6) is fulfilled.

$$0.1<(R8+R9)/(R8-R9)<0.8 \tag{6}$$

where

R8: a curvature radius on the optical axis of the surface on the object side of the fourth lens R9: a curvature radius on the optical axis of the surface on the image side of the fourth lens

<25>

The imaging lens according to any one of <21> to <24> described above, in which a following conditional expression (7) is fulfilled.

$$-2.3<f5/f<-1.1 \tag{7}$$

where f5: a focal length of the fifth lens
f: a focal length of an entire system

REFERENCE SIGNS LIST

1 . . . Imaging lens, 2 . . . Imaging lens, 3 . . . Imaging lens, 4 . . . Imaging lens, 5 . . . Imaging lens, 6 . . . Imaging lens, 7 . . . Imaging lens, 8 . . . Imaging lens, 9 . . . Imaging lens, 10 . . . Imaging lens, 11 . . . Imaging lens, 12 . . . Imaging lens, L1 . . . First lens, L2 . . . Second lens, L3 . . . Third lens, L4 . . . Fourth lens, L5 . . . Fifth lens, L6 . . . Sixth lens, S . . . Aperture stop, CG . . . Parallel plate, IM . . . Image surface, Z . . . Optical axis

The invention claimed is:

1. An imaging lens, comprising:
a first lens having a negative refracting power and having a meniscus shape in which a convex surface is directed toward an object side;
a second lens having a negative refracting power and having a meniscus shape in which a convex surface is directed toward the object side;
a third lens having a positive refracting power and having a meniscus shape in which a concave surface is directed toward the object side;
an aperture stop;
a fourth lens having a positive refracting power and having a bi-convex shape;
a fifth lens having a negative refracting power and having a bi-concave shape; and
a sixth lens having a positive refracting power and having a bi-convex shape,
the first lens, the second lens, the third lens, the aperture stop, the fourth lens, the fifth lens, and the sixth lens being arranged in order from the object side to an image surface side,
the first lens, the second lens, the third lens, the fourth lens, the fifth lens and the sixth lens are each independent lenses and are the only lenses in the imaging lens,
the total angle of view being set to 150 degrees or more, following conditional expression (1), conditional expression (2), and conditional expression (3) being fulfilled, $$44<vd1 \tag{1}$$

$$Nd1<1.78 \tag{2}$$

$$2.505<f456/f<3.5 \tag{3}$$

where vd1: an Abbe's number in a d-line of the first lens
Nd1: a refractive index in the d-line of the first lens
f456: a synthetic focal length of the fourth lens, the fifth lens, and the sixth lens
f: a focal length of an entire system.

2. The imaging lens according to claim 1, wherein a following conditional expression (4) is fulfilled:

$$-0.25<(R10+R11)/(R10-R11)<0.6 \tag{4}$$

where

R10: a curvature radius on the optical axis of the surface on the object side of the fifth lens
R11: a curvature radius on the optical axis of the surface on an image side of the fifth lens.

3. The imaging lens according to claim 1, wherein a following conditional expression (5) is fulfilled:

$$-4<R6/f<-1 \tag{5}$$

where

R6: a curvature radius on the optical axis of the surface on an image side of the third lens
f: a focal length of an entire system.

4. The imaging lens according to claim 1, wherein a following conditional expression (6) is fulfilled:

$$0.1<(R8+R9)/(R8-R9)<0.8 \tag{6}$$

where

R8: a curvature radius on the optical axis of the surface on the object side of the fourth lens
R9: a curvature radius on the optical axis of the surface on an image side of the fourth lens.

5. The imaging lens according to claim 1, wherein a following conditional expression (7) is fulfilled:

$$-2.3<f5/f<-1.1 \tag{7}$$

where f5: a focal length of the fifth lens
f: a focal length of an entire system.

6. An imaging lens, comprising:
a first lens having a negative refracting power and having a meniscus shape in which a convex surface is directed toward an object side;
a second lens having a negative refracting power and having a meniscus shape in which a convex surface is directed toward the object side;
a third lens having a positive refracting power and having a meniscus shape in which a concave surface is directed toward the object side;
an aperture stop;
a fourth lens having a positive refracting power and having a bi-convex shape;
a fifth lens having a negative refracting power and having a bi-concave shape; and
a sixth lens having a positive refracting power and having a bi-convex shape, the first lens, the second lens, the third lens, the aperture stop, the fourth lens, the fifth lens, and the sixth lens being arranged in order from the object side to an image surface side, the first lens, the second lens, the third lens, the fourth lens, the fifth lens and the sixth lens are each independent lenses and are the only lenses in the imaging lens, the total angle of view being set to 150 degrees or more, following conditional expression (1), conditional expression (2), and conditional expression (9) being fulfilled, $$44 < vd1 \quad (1)$$

$$Nd1 < 1.78 \quad (2)$$

$$10.7 < L/f < 16.5 \quad (8)$$

where
vd1: an Abbe's number in a d-line of the first lens
Nd1: a refractive index in the d-line of the first lens
L: a distance from a vertex on the optical axis of the surface on the object side of the first lens to the image surface
f: a focal length of an entire system.

7. The imaging lens according to claim 6, wherein a following conditional expression (4) is fulfilled:

$$-0.25 < (R10+R11)/(R10-R11) < 0.6 \quad (4)$$

where
R10: a curvature radius on the optical axis of the surface on the object side of the fifth lens
R11: a curvature radius on the optical axis of the surface on an image side of the fifth lens.

8. The imaging lens according to claim 6, wherein a following conditional expression (5) is fulfilled:

$$-4 < R6/f < -1 \quad (5)$$

where
R6: a curvature radius on the optical axis of the surface on an image side of the third lens
f: a focal length of an entire system.

9. The imaging lens according to claim 6, wherein a following conditional expression (6) is fulfilled:

$$0.1 < (R8+R9)/(R8-R9) < 0.8 \quad (6)$$

where
R8: a curvature radius on the optical axis of the surface on the object side of the fourth lens
R9: a curvature radius on the optical axis of the surface on an image side of the fourth lens.

10. The imaging lens according to claim 6, wherein a following conditional expression (7) is fulfilled:

$$-2.3 < f5/f < -1.1 \quad (7)$$

where
f5: a focal length of the fifth lens
f: a focal length of an entire system.

11. An imaging lens, comprising:
a first lens having a negative refracting power and having a meniscus shape in which a convex surface is directed toward an object side;
a second lens having a negative refracting power and having a meniscus shape in which a convex surface is directed toward the object side;
a third lens having a positive refracting power and having a meniscus shape in which a concave surface is directed toward the object side;
an aperture stop;
a fourth lens having a positive refracting power and having a bi-convex shape;
a fifth lens having a negative refracting power and having a bi-concave shape; and
a sixth lens having a positive refracting power and having a bi-convex shape, the first lens, the second lens, the third lens, the aperture stop, the fourth lens, the fifth lens, and the sixth lens being arranged in order from the object side to an image surface side, the first lens, the second lens, the third lens, the fourth lens, the fifth lens and the sixth lens are each independent lenses and are the only lenses in the imaging lens, the total angle of view being set to 150 degrees or more,
a following conditional expression (11) being fulfilled, $$1.75 < R12/f < 2.7 \quad (11)$$

where
R12: a curvature radius on the optical axis of the surface on the object side of the sixth lens
f: a focal length of an entire system.

12. The imaging lens according to claim 11, wherein a following conditional expression (4) is fulfilled:

$$-0.25 < (R10+R11)/(R10-R11) < 0.6 \quad (4)$$

where
R10: a curvature radius on the optical axis of the surface on the object side of the fifth lens
R11: a curvature radius on the optical axis of the surface on an image side of the fifth lens.

13. The imaging lens according to claim 11, wherein a following conditional expression (5) is fulfilled:

$$-4 < R6/f < -1 \quad (5)$$

where
R6: a curvature radius on the optical axis of the surface on an image side of the third lens
f: a focal length of an entire system.

14. The imaging lens according to claim 11, wherein a following conditional expression (6) is fulfilled:

$$0.1 < (R8+R9)/(R8-R9) < 0.8 \quad (6)$$

where
R8: a curvature radius on the optical axis of the surface on the object side of the fourth lens
R9: a curvature radius on the optical axis of the surface on an image side of the fourth lens.

15. The imaging lens according to claim 11, wherein a following conditional expression (7) is fulfilled:

$$-2.3 < f5/f < -1.1 \quad (7)$$

where
f5: a focal length of the fifth lens
f: a focal length of an entire system.

16. An imaging apparatus, comprising:
an image sensor; and
an imaging lens including:
a first lens having a negative refracting power and having a meniscus shape in which a convex surface is directed toward an object side;
a second lens having a negative refracting power and having a meniscus shape in which a convex surface is directed toward the object side;
a third lens having a positive refracting power and having a meniscus shape in which a concave surface is directed toward the object side;

an aperture stop;
a fourth lens having a positive refracting power and having a bi-convex shape;
a fifth lens having a negative refracting power and having a bi-concave shape; and
a sixth lens having a positive refracting power and having a bi-convex shape,
the first lens, the second lens, the third lens, the aperture stop, the fourth lens, the fifth lens, and the sixth lens being arranged in order from the object side to an image surface side,
the first lens, the second lens, the third lens, the fourth lens, the fifth lens and the sixth lens are each independent lenses and are the only lenses in the imaging lens,
the total angle of view being set to 150 degrees or more,
following conditional expression (1), conditional expression (2), and conditional expression (3) being fulfilled, $$44 < vd1 \tag{1}$$

$$Nd1 < 1.78 \tag{2}$$

$$2.505 < f456/f < 3.5 \tag{3}$$

where
vd1: an Abbe's number in a d-line of the first lens
Nd1: a refractive index in the d-line of the first lens
f456: a synthetic focal length of the fourth lens, the fifth lens, and the sixth lens
f: a focal length of an entire system.

17. An imaging apparatus, comprising:
an image sensor; and
an imaging lens including:
a first lens having a negative refracting power and having a meniscus shape in which a convex surface is directed toward an object side;
a second lens having a negative refracting power and having a meniscus shape in which a convex surface is directed toward the object side;
a third lens having a positive refracting power and having a meniscus shape in which a concave surface is directed toward the object side;
an aperture stop;
a fourth lens having a positive refracting power and having a bi-convex shape;
a fifth lens having a negative refracting power and having a bi-concave shape; and
a sixth lens having a positive refracting power and having a bi-convex shape,
the first lens, the second lens, the third lens, the aperture stop, the fourth lens, the fifth lens, and the sixth lens being arranged in order from the object side to an image surface side,
the first lens, the second lens, the third lens, the fourth lens, the fifth lens and the sixth lens are each independent lenses and are the only lenses in the imaging lens,
the total angle of view being set to 150 degrees or more,
following conditional expression (1), conditional expression (2), and conditional expression (9) being fulfilled, $$44 < vd1 \tag{1}$$

$$Nd1 < 1.78 \tag{2}$$

$$10.7 < L/f < 16.5 \tag{8}$$

where
vd1: an Abbe's number in a d-line of the first lens
Nd1: a refractive index in the d-line of the first lens
L: a distance from a vertex on the optical axis of the surface on the object side of the first lens to the image surface
f: a focal length of an entire system.

18. An imaging apparatus, comprising:
an image sensor; and
an imaging lens including:
a first lens having a negative refracting power and having a meniscus shape in which a convex surface is directed toward an object side;
a second lens having a negative refracting power and having a meniscus shape in which a convex surface is directed toward the object side;
a third lens having a positive refracting power and having a meniscus shape in which a concave surface is directed toward the object side;
an aperture stop;
a fourth lens having a positive refracting power and having a bi-convex shape;
a fifth lens having a negative refracting power and having a bi-concave shape; and
a sixth lens having a positive refracting power and having a bi-convex shape,
the first lens, the second lens, the third lens, the aperture stop, the fourth lens, the fifth lens, and the sixth lens being arranged in order from the object side to an image surface side,
the first lens, the second lens, the third lens, the fourth lens, the fifth lens and the sixth lens are each independent lenses and are the only lenses in the imaging lens,
the total angle of view being set to 150 degrees or more,
a following conditional expression (11) being fulfilled, $$1.75 < R12/f < 2.7 \tag{11}$$

where
R12: a curvature radius on the optical axis of the surface on the object side of the sixth lens
f: a focal length of an entire system.

* * * * *